United States Patent
Watanuki

(10) Patent No.: US 12,486,343 B2
(45) Date of Patent: Dec. 2, 2025

(54) METHOD FOR PRODUCING IODINE-CONTAINING COMPOUND, AND IODINE-CONTAINING COMPOUND

(71) Applicant: AGC INC., Tokyo (JP)

(72) Inventor: Shun Watanuki, Chiyoda-ku (JP)

(73) Assignee: AGC INC., Tokyo (JP)

( * ) Notice: Subject to any disclaimer, the term of this patent is extended or adjusted under 35 U.S.C. 154(b) by 494 days.

(21) Appl. No.: 18/175,687

(22) Filed: Feb. 28, 2023

(65) Prior Publication Data

US 2023/0203215 A1 Jun. 29, 2023

Related U.S. Application Data

(63) Continuation of application No. PCT/JP2021/030686, filed on Aug. 20, 2021.

(30) Foreign Application Priority Data

Sep. 9, 2020 (JP) .................. 2020-151426

(51) Int. Cl.

| | |
|---|---|
| C08F 114/16 | (2006.01) |
| C07F 7/08 | (2006.01) |
| C08F 4/04 | (2006.01) |
| C08F 4/14 | (2006.01) |
| C08F 114/18 | (2006.01) |

(52) U.S. Cl.
CPC .............. *C08F 114/16* (2013.01); *C07F 7/08* (2013.01); *C08F 4/04* (2013.01); *C08F 114/185* (2013.01)

(58) Field of Classification Search
CPC .... C08F 114/16; C08F 114/185; C08F 14/06; C08F 14/22; C08F 14/24; C08F 14/185; C08F 293/005; C08F 2/38; C07F 7/08
See application file for complete search history.

(56) References Cited

U.S. PATENT DOCUMENTS

| | | | | |
|---|---|---|---|---|
| 5,345,018 A | * | 9/1994 | Bak ....................... | C07C 17/087 570/248 |
| 5,455,319 A | * | 10/1995 | Bak ......................... | C08F 14/06 526/206 |
| 2016/0185693 A1 | | 6/2016 | Guerra et al. | |
| 2019/0389983 A1 | | 12/2019 | Ohkura et al. | |
| 2022/0389132 A1 | | 12/2022 | Watanuki | |

FOREIGN PATENT DOCUMENTS

| | | | |
|---|---|---|---|
| FR | 2107651 A5 | * | 5/1972 |
| JP | 2016-504446 | | 2/2016 |
| WO | WO 2015/173193 A1 | | 11/2015 |
| WO | WO 2018/164147 A1 | | 9/2018 |
| WO | WO 2021/161851 A1 | | 8/2021 |

OTHER PUBLICATIONS

Machine translation into English of FR-2107651-A5; Nobel (Year: 1972).*
International Search Report issued Oct. 26, 2021 in PCT/JP2021/030686 filed on Aug. 20, 2021, 17-18 there in 2 pages.
Mineto Uchiyama et al: "Cooperative reduction of various RAFT polymer terminals using hydrosilane and thiol via polarity reversal catalysis", Chemical Communications, vol. 55, No. 37, May 10, 2019, 5 pages.

* cited by examiner

*Primary Examiner* — Karuna P Reddy
(74) *Attorney, Agent, or Firm* — Oblon, McClelland, Maier & Neustadt, L.L.P.

(57) ABSTRACT

A method for producing an iodine-containing compound includes reacting a halogen-containing organic iodine compound and a compound containing a reactive carbon-carbon double bond in the presence of a compound of Formula (21) or Formula (22). Each of $R^{21}$, $R^{23}$ and $R^{24}$ represents a hydrogen atom, an iodine atom, or an organic group having from 1 to 20 carbon atoms; $R^{22}$ represents a hydrogen atom, an iodine atom, an organic group having from 1 to 20 carbon atoms, or a boron-containing group; $R^{25}$ represents a hydrogen atom, an iodine atom, an organic group having from 1 to 20 carbon atoms, or a silicon-containing group; and each of $A^1$ and $A^2$ represents a hydrogen atom, a chlorine atom, a bromine atom, or an iodine atom.

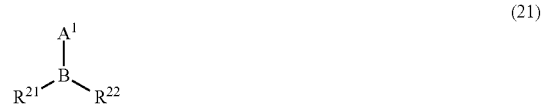

(21)

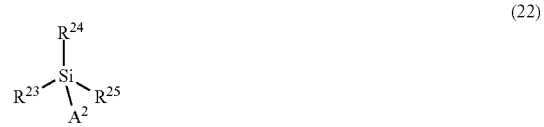

(22)

14 Claims, No Drawings

METHOD FOR PRODUCING IODINE-CONTAINING COMPOUND, AND IODINE-CONTAINING COMPOUND

TECHNICAL FIELD

The present disclosure relates to a method for producing an iodine-containing compound, and an iodine-containing compound.

BACKGROUND ART

Radical polymerization reactions are widely used in industry owing to their excellent monomer versatility and ease of carrying out even in polar media such as water. However, general radical polymerization methods are capable of only a limited control over the molecular weight, and the molecular weight distribution of resulting polymers tends to be wide.

On the other hand, living radical polymerization methods have attracted attention as polymerization methods that can produce polymers having a controlled molecular weight and a narrow molecular weight distribution, and a variety of polymerization control agents have been developed. Living radical polymerization methods are polymerization methods that control the radical polymerization rate by reversibly protecting the growing radicals with protective groups, which are dormant species, thereby enabling the control of the molecular weight distribution. Further, in the living radical polymerization methods, it is also possible to use an obtained polymer as a polymerization initiator or a chain transfer agent to add a different compound by a radical reaction.

Patent Document 1 describes a living radical polymerization method for producing a halo-olefin polymer or copolymer by radical polymerization of a specific halo-olefin in the presence of a specific organo tellurium compound. This method is called the organo tellurium mediated living radical polymerization (TERP) method.

Patent document 2 discloses a method for producing a polymer by emulsion polymerization of fluorine-containing monomers by the reversible addition fragmentation chain transfer (RAFT) method, which is one of the living radical polymerization methods. The RAFT method enables control of the molecular weight distribution by allowing the polymerization to take place through a reversible chain transfer reaction in the presence of a specific chain transfer agent called a RAFT agent.

As a further form of living radical polymerization, the iodine transfer polymerization (ITP) method is known. The ITP method is a polymerization method that uses an organic iodine compound as a chain transfer agent, and is useful in that the method can also be applied to fluorinated monomers.

PRIOR ART DOCUMENTS

Patent Documents

Patent Document 1 International Publication (WO) No. 2018/164147
Patent Document 2 International Publication (WO) No. 2015/173193

SUMMARY OF INVENTION

Technical Problem

When an organic iodine compound is used as a chain transfer agent or a polymerization initiator, in order to obtain an extended product by further allowing the radical reaction to proceed starting from this organic iodine compound, the iodine of the C—I bond at the terminal needs to be abstracted. However, when a compound in which a fluorine atom or a chlorine atom is directly bonded to the carbon atom of the C—I bond (herein also referred to as "halogen-containing organic iodine compound" for convenience) is used, it is difficult to allow the abstraction of the iodine to occur at an appropriate rate. Therefore, when such a halogen-containing organic iodine compound is used, it is difficult to obtain an extended product from the halogen-containing organic iodine compound using conventional methods, and it is also difficult to achieve sufficient controllability.

In view of these circumstances, an object of the present disclosure is to provide a method for producing an iodine-containing compound in which an extended product having a controlled molecular weight distribution can be obtained by extending a halogen-containing organic iodine compound containing a fluorine atom or a chlorine atom, and an iodine-containing compound having controlled molecular weight distribution.

Solution to Problem

Embodiments according to the present disclosure includes the following embodiments.

<1> A method for producing an iodine-containing compound, the method including reacting Compound (10) having a substructure represented by the following Formula (1) and a compound represented by the following Formula (3) in the presence of at least one selected from the group consisting of a compound represented by the following Formula (21) and a compound represented by the following Formula (22):

wherein, in Formula (1), * represents a binding site bonded to an organic group; X represents a fluorine atom or a chlorine atom; $X^1$ represents a hydrogen atom, a fluorine atom, a chlorine atom, a bromine atom, an iodine atom, or —$CX^5X^6X^7$; and each of $X^5$ to $X^7$ independently represents a hydrogen atom, a fluorine atom, or a chlorine atom;

wherein, in Formula (21), $R^{21}$ represents a hydrogen atom, an iodine atom, or a substituted or unsubstituted organic group having from 1 to 20 carbon atoms; $R^{22}$ represents a hydrogen atom, an iodine atom, a substituted or unsubstituted organic group having from 1 to 20 carbon atoms, or a boron-containing group, wherein a boron atom in the boron-containing group is bonded to the boron atom in Formula (21); $R^{21}$ and $R^{22}$ may be linked to form a ring structure; $A^1$ represents a hydrogen atom, a chlorine atom, a bromine atom, or an iodine atom; and the boron atom in Formula (21) may be further coordinated with a ligand;

wherein, in Formula (22), each of $R^{23}$ and $R^{24}$ independently represents a hydrogen atom, an iodine atom, or a substituted or unsubstituted organic group having from 1 to 20 carbon atoms, and $R^{25}$ represents a hydrogen atom, an iodine atom, a substituted or unsubstituted organic group having from 1 to 20 carbon atoms, or a silicon-containing group, wherein a silicon atom in the silicon-containing group is bonded to the silicon atom in Formula (22), with the proviso that not all of $R^{23}$ to $R^{25}$ are hydrogen atoms; two or more of $R^{23}$, $R^{24}$, and $R^{25}$ may be linked to form a ring structure; and $A^2$ represents a hydrogen atom, a chlorine atom, a bromine atom, or an iodine atom; and wherein, in Formula (3), each of $R^1$ to $R^4$ independently represents a hydrogen atom, a fluorine atom, a chlorine atom, a bromine atom, an iodine atom, or a substituted or unsubstituted organic group having from 1 to 40 carbon atoms; and $R^1$ and $R^4$, or $R^2$ and $R^3$ may be linked to form a ring structure.

<2> The method according to <1>,
wherein, in Formula (3), each of $R^1$ to $R^4$ independently represents a hydrogen atom, a chlorine atom, a bromine atom, an iodine atom, or a substituted or unsubstituted organic group having from 1 to 40 carbon atoms and having at least one reactive carbon-carbon double bond, and $R^1$ and $R^4$, or $R^2$ and $R^3$ may be linked to form a ring structure, and wherein Formula (3) has at least two reactive carbon-carbon double bonds.

<3> The method according to <1>, wherein the compound represented by Formula (3) includes a compound represented by the following Formula (5):

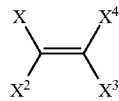

(5)

wherein, in the formula, X represents a fluorine atom or a chlorine atom; each of $X^2$ to $X^4$ independently represents a hydrogen atom, a fluorine atom, a chlorine atom, a bromine atom, an iodine atom, or —$CX^5X^6X^7$; and each of $X^5$ to $X^7$ independently represents a hydrogen atom, a fluorine atom, or a chlorine atom.

<4> The method according to <3>, wherein the iodine-containing compound obtained is a copolymer formed by copolymerization of a first compound represented by Formula (5) and a compound represented by Formula (3) that is different from the first compound.

<5> The method according to <4>, wherein the copolymerization is block copolymerization.

<6> The method according to <4>, wherein the copolymerization is random copolymerization or alternating copolymerization.

<7> The method according to any one of <4> to <6>, wherein the compound represented by Formula (3) that is different from the first compound is at least one selected from the group consisting of ethylene, propylene, isobutylene, alkyl vinyl ether, hexafluoropropylene, perfluoro(alkyl vinyl ether), triallyl isocyanurate, 1,4-divinyl octafluorobutane, 1,6-divinyl dodecafluorohexane, vinyl acetate, styrene, butyl acrylate, and divinylbenzene.

<8> The method according to any one of <3> to <7>, wherein the compound represented by Formula (5) is at least one selected from the group consisting of vinyl fluoride, vinylidene fluoride, trifluoroethylene, chlorotrifluoroethylene, bromotrifluoroethylene, iodotrifluoroethylene, tetrafluoroethylene, hexafluoropropylene, 1,3,3,3-tetrafluoropropylene, 2,3,3,3-tetrafluoropropyl ene, 1-chloro-1-fluoroethylene, 1-bromo-1-fluoroethyl ene, 1-iodo-1-fluoroethylene, 1,1-dibromo-2,2-difluoroethylene, 1,1-difluoro-2,2-diiodoethylene, 1,2-dichloro-1,2-difluoroethylene, 1,2-dibromo-1,2-difluoroethylene, 1,2-difluoro-1,2-diiodoethylene, vinyl chloride, and vinylidene chloride.

<9> The method according to any one of <1> to <8>, wherein the Compound (10) is a compound represented by the following Formula (11) or a compound represented by the following Formula (12):

wherein, in the formulas, $R^{11}$ represents a perfluoroalkyl group having from 1 to 4 carbon atoms; $R^{12}$ represents a perfluoroalkylene group having from 1 to 4 carbon atoms; each X independently represents a fluorine atom or a chlorine atom; each of $X^{21}$ to $X^{23}$ independently represents a hydrogen atom, a fluorine atom, a chlorine atom, a bromine atom, or —$CX^{24}X^{25}X^{26}$; and each of $X^{24}$ to $X^{26}$ independently represents a hydrogen atom, a fluorine atom, or a chlorine atom.

<10> The method according to any one of <1> to <9>, wherein the Compound (10) is a compound containing a plurality of units represented by the following Formula (4):

wherein, in the formula, each of $X^{31}$ to $X^{34}$ independently represents a hydrogen atom, a fluorine atom, a chlorine atom, a bromine atom, an iodine atom, or —$CX^{35}X^{36}X^{37}$; and each of $X^{35}$ to $X^{37}$ independently represents a hydrogen atom, a fluorine atom, or a chlorine atom.

<11> The method according to <10>, wherein a fluorine content of the Compound (10) is 50% by mass or more.

<12> The method according to any one of <1> to <11>, wherein the iodine-containing compound obtained is a polymer, and
wherein the polydispersity of the polymer is 2.0 or less.

<13> The method according to any one of <1> to <12>, wherein, in Formula (21), $A^1$ is a hydrogen atom and the boron atom has a ligand, or $A^1$ is an iodine atom.

<14> The method according to any one of <1> to <12>, wherein, in Formula (22), at least one selected from the group consisting of $R^{23}$, $R^{24}$, and $R^{25}$ contains an aromatic ring.

<15> An iodine-containing compound,
wherein the iodine-containing compound is a polymer including a structure originating from an azo radical initiator or a peroxide radical initiator, and
wherein a ratio of structures originating from the azo radical initiator or the peroxide radical initiator with respect to polymer ends is 40 mol % or less.

Advantageous Effects of Invention

According to the present disclosure, a method for producing an iodine-containing compound in which an extended product having a controlled molecular weight distribution can be obtained by extending a halogen-containing organic iodine compound containing a fluorine atom or a chlorine atom, and an iodine-containing compound having controlled molecular weight distribution are provided.

DESCRIPTION OF EMBODIMENTS

Embodiments according to the present disclosure are described in detail below; however, the embodiments according to the present disclosure are not limited to the following embodiments.

In the present disclosure, the term "step" encompasses an independent step separated from other steps as well as a step that is not clearly separated from other steps, as long as a purpose of the step can be achieved.

In the present disclosure, a numerical range specified using "(from) . . . to . . . " represents a range including the numerical values noted before and after "to" as a minimum value and a maximum value, respectively.

In the present disclosure, each component may include plural substances corresponding to the component. In a case in which plural substances corresponding to a component are present in a composition, the amount or content of the component in the composition means the total amount or content of the plural substances present in the composition unless otherwise specified.

In the present disclosure, unless otherwise specified, an organic group or a hydrocarbon group may or may not have a substituent.

In the present disclosure, the number of carbon atoms in a chemical structure means the total number of carbon atoms in the entire chemical structure, and represents the number of carbon atoms forming the skeleton of the chemical structure when the chemical structure has no substituents, and represents, when the chemical structure has substituents, the sum of the number of carbon atoms forming the skeleton of the chemical structure and the number of the carbon atoms of the substituents.

An aryl group means a monovalent group corresponding to a residue having a structure in which one hydrogen atom bonded to one carbon atom of the carbon atoms forming an aromatic ring of an aromatic compound is removed, and is used as a collective term for both a homoaryl group derived from a carbon ring compound and a heteroaryl group derived from a heterocyclic compound.

An arylene group means a divalent group corresponding to a residue having a structure in which one hydrogen atom bonded to one carbon atom of an aryl group is removed.

In the present disclosure, a reactive carbon-carbon double bond means a carbon-carbon double bond that can react in a certain way as an olefin, and does not encompass aromatic double bonds.

In the present disclosure, (meth)acrylic acid is a collective term for acrylic acid and methacrylic acid. (Meth)acrylate is a collective term for acrylate and methacrylate. (Meth)acrylamide is a collective term for acrylamide and methacrylamide.

In the present disclosure, a "polymer" is a compound formed by polymerization of monomers. In other words, a "polymer" includes plural of structural units.

In the present disclosure, unless otherwise specified, the description "polymerizing Compound A" encompasses both cases in which only the Compound A is polymerized and in which the Compound A and another compound are polymerized. The description "polymerizing Compound A and Compound B" encompasses both cases in which only the Compound A and the Compound B are polymerized, and in which the Compound A, the Compound B and another compound are polymerized. Here, each of the Compound A and Compound B represents any of the compounds described in the present disclosure having a carbon-carbon double bond in the molecule. Unless otherwise specified, a polymer described in the present disclosure may be a monopolymer of one compound or a copolymer of two or more compounds.

Embodiments according to the present disclosure are hereinafter described in detail. However, embodiments according to the present disclosure are not limited to the following embodiments. In the following embodiments, components (including elemental steps and the like) are not essential, unless specifically indicated otherwise. The same applies to numerical values and ranges thereof, and the embodiments according to the present disclosure are not limited thereby.

<<Method for Producing Iodine-Containing Compound>>

The method for producing an iodine-containing compound according to the present disclosure (hereinafter, also referred to as a production method according to the present disclosure) includes reacting Compound (10) having a substructure represented by the following Formula (1) with a compound represented by the following Formula (3) in the presence of at least one selected from the group consisting of a compound represented by the following Formula (21) and a compound represented by the following Formula (22).

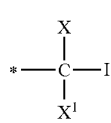

(1)

(In Formula (1), * represents a binding site bonded to an organic group. X represents a fluorine atom or a chlorine atom. $X^1$ represents a hydrogen atom, a fluorine atom, a chlorine atom, a bromine atom, an iodine atom, or $-CX^5X^6X^7$. Each of $X^5$ to $X^7$ independently represents a hydrogen atom, a fluorine atom, or a chlorine atom.)

$$\begin{array}{c} A^1 \\ | \\ R^{21} - B - R^{22} \end{array} \quad (21)$$

$$\begin{array}{c} R^{24} \\ | \\ R^{23} - Si - R^{25} \\ | \\ A^2 \end{array} \quad (22)$$

In Formula (21), $R^{21}$ represents a hydrogen atom, an iodine atom, or a substituted or unsubstituted organic group having from 1 to 20 carbon atoms, and $R^{22}$ represents a hydrogen atom, an iodine atom, a substituted or unsubstituted organic group having from 1 to 20 carbon atoms, or a boron-containing group, wherein a boron atom in the boron-containing group is bonded to the boron atom in Formula (21). $R^{21}$ and $R^{22}$ may be linked to form a ring structure. $A^1$ represents a hydrogen atom, a chlorine atom, a bromine atom, or an iodine atom. The boron atom in Formula (21) may be further coordinated with a ligand.

In Formula (22), each of $R^{23}$ and $R^{24}$ independently represents a hydrogen atom, an iodine atom, or a substituted or unsubstituted organic group having from 1 to 20 carbon atoms, and $R^{25}$ represents a hydrogen atom, an iodine atom, a substituted or unsubstituted organic group having from 1 to 20 carbon atoms, or a silicon-containing group, wherein a silicon atom in the silicon-containing group is bonded to the silicon atom in Formula (22), with the proviso that not all of $R^{23}$ to $R^{25}$ are hydrogen atoms. Two or more of $R^{23}$, $R^{24}$, and $R^{25}$ may be linked to form a ring structure. $A^2$ represents a hydrogen atom, a chlorine atom, a bromine atom, or an iodine atom.

$$\begin{array}{c} R^1 \quad\quad R^4 \\ \diagdown \quad \diagup \\ \diagup \quad \diagdown \\ R^2 \quad\quad R^3 \end{array} \quad (3)$$

(In Formula (3), each of $R^1$ to $R^4$ independently represents a hydrogen atom, a fluorine atom, a chlorine atom, a bromine atom, an iodine atom, or a substituted or unsubstituted organic group having from 1 to 40 carbon atoms. $R^1$ and $R^4$, or $R^2$ and $R^3$ may be linked to form a ring structure.)

It was found that, by the production method according to the present disclosure, a halogen-containing organic iodine compound containing a fluorine atom or a chlorine atom can be extended to obtain an extended product having a controlled molecular weight distribution, by using at least one selected from the group consisting of a compound represented by Formula (21) and a compound represented by Formula (22) as a catalyst. The production method according to the present disclosure is based on a living radical polymerization method called reversible chain transfer catalyzed living radical polymerization (RTCP), and proceeds according to the mechanism illustrated in the following figure.

$$W\cdot + A-Y \longrightarrow W-A + Y\cdot$$

$$\begin{array}{c} X \\ | \\ *-C-I \\ | \\ X^1 \end{array} + Y\cdot \longrightarrow \begin{array}{c} X \\ | \\ *-C\cdot \\ | \\ X^1 \end{array} + $$

$$\begin{array}{c} R_1 \quad R_4 \\ \diagdown \diagup \\ \diagup \diagdown \\ R_2 \quad R_3 \end{array} \quad \longrightarrow \quad \begin{array}{c} X \quad R_1 \quad R_4 \\ | \quad | \quad | \\ *-C-C\cdot \\ | \quad | \quad | \\ X^1 \quad R_2 \quad R_3 \end{array} \Longrightarrow$$

$$I-Y$$

$$*-\begin{array}{c} X \\ | \\ C \\ | \\ X^1 \end{array}\left[\begin{array}{cc} R_1 & R_4 \\ | & | \\ & \\ | & | \\ R_2 & R_3 \end{array}\right]_n \begin{array}{c} R_1 \quad R_4 \\ | \quad | \\ C\cdot \\ | \quad | \\ R_2 \quad R_3 \end{array} \xrightarrow{Z-I}$$

$$*-\begin{array}{c} X \\ | \\ C \\ | \\ X^1 \end{array}\left[\begin{array}{cc} R_1 & R_3 \\ | & | \\ & \\ | & | \\ R_2 & R_4 \end{array}\right]_n \begin{array}{c} R_1 \quad R_3 \\ | \quad | \\ \\ | \quad | \\ R_2 \quad R_4 \end{array}-I \; + \; Z\cdot$$

W: radical species (W is any structure)

A-Y: catalyst (at least one selected from the compound represented by Formula (21) and the compound represented by Formula (22); in the case of Formula (21), A represents $A^1$, and Y represents a structure other than $A^1$; in the case of Formula (22), A represents $A^2$, and Y represents a structure other than $A^2$.

Z-I: iodine compound (I represents an iodine atom, Z represents a freely-selected structure (e.g., alkyl iodide, iodine end of a polymer, I-Y))

Each of X and $X^1$: synonymous with X and $X^1$ in Formula (1)

Each of $R^1$ to $R^4$: synonymous with $R^1$ to $R^4$ in Formula (3)

First, a radical species (W) present in the reaction system reacts with the catalyst (A-Y) to generate a Y radical (Y·). This Y radical (Y·) can favorably abstract the iodine from the halogen-containing organic iodine compound. As a result, the iodine, which is a protective group, is abstracted, and radical reactions starting from the halogen-containing organic iodine compound proceeds to generate an extended product. When a radical at the end of the extended product reacts with the iodine compound (Z-I), the end of the extended product is reprotected.

In conventional methods, it is difficult to have iodine abstracted from a halogen-containing organic iodine compound in which a fluorine atom or a chlorine atom is directly bonded to the carbon of a C—I bond, that is, a compound having the substructure —$CXX^1I$ (X is a fluorine atom or a chlorine atom), and therefore, it has been difficult to allow extension of such a halogen-containing organic iodine compound to proceed so as to obtain an extended product having a controlled molecular weight. This is presumed to be partly due to instability of the radical on the carbon atom of the C—X bond. On the other hand, it was found that use of the specific compound selected from the group consisting of a compound represented by Formula (21) and a compound represented by Formula (22) as a catalyst (A-Y) facilitates abstraction of iodine from the halogen-containing organic iodine compound, thereby realizing a highly controlled extension reaction.

Accordingly, for example, by polymerizing a halogen-containing monomer using the production method according to the present disclosure, it is possible to produce a fluorine-containing polymer or a chlorine-containing polymer having a controlled molecular weight distribution. In addition, by allowing a reaction between a fluorine-containing polymer or a chlorine-containing polymer and a cross-linking agent to proceed using the production method according to the present disclosure, it is also possible to apply the production method to the production of cross-linked rubber or the like.

First, compounds used in the production method according to the present disclosure will be described.

<Compounds Represented by Formula (21) and Formula (22)>

The compound represented by the following Formula (21) acts as a catalyst to mediate abstraction of iodine of the halogen-containing organic iodine compound.

(Compound Represented by Formula (21))

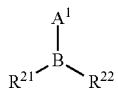

(21)

In Formula (21), $R^{21}$ represents a hydrogen atom, an iodine atom, or a substituted or unsubstituted organic group having from 1 to 20 carbon atoms, and $R^{22}$ represents a hydrogen atom, an iodine atom, a substituted or unsubstituted organic group having from 1 to 20 carbon atoms, or a boron-containing group, wherein a boron atom in the boron-containing group is bonded to the boron atom in Formula (21). $R^{21}$ and $R^{22}$ may be linked to form a ring structure. $A^1$ represents a hydrogen atom, a chlorine atom, a bromine atom, or an iodine atom. The boron atom in Formula (21) may be further coordinated with a ligand.

In the reaction system, a radical on an atom generated by abstraction of $A^1$ from the compound represented by Formula (21) abstracts iodine from the halogen-containing organic iodine compound.

The substituted or unsubstituted organic group having from 1 to 20 carbon atoms represented by each of $R^{21}$ and $R^{22}$ is independently, preferably, a substituted or unsubstituted organic group having from 1 to 15 carbon atoms, and more preferably a substituted or unsubstituted organic group having from 1 to 10 carbon atoms. Examples of the organic group include a saturated or unsaturated hydrocarbon group and —OR (R is a substituted or unsubstituted hydrocarbon group having from 1 to 20 carbon atoms, preferably a substituted or unsubstituted hydrocarbon group having from 1 to 15 carbon atoms, more preferably a substituted or unsubstituted hydrocarbon group having from 1 to 10 carbon atoms).

As the substituted or unsubstituted organic group having from 1 to 20 carbon atoms represented by each of $R^{21}$ and $R^{22}$, an organic group including a carbon atom bonded to the boron atom is preferable. Furthermore, the carbon atom is preferably an sp3 carbon atom. This facilitates generation of a boron radical, and also enhances the ability of the radical to abstract iodine. From these viewpoints, as the substituted or unsubstituted organic group having from 1 to 20 carbon atoms represented by each of $R^{21}$ and $R^{22}$, a substituted or unsubstituted alkyl group is preferable.

When the substituted or unsubstituted organic group having from 1 to 20 carbon atoms represented by $R^{21}$ or $R^{22}$ has a substituent, examples of the substituent include a group containing a boron atom. Examples of the group containing a boron atom include —$BY_2$, wherein each Y is independently a hydrogen atom, a chlorine atom, a bromine atom, an iodine atom, or a substituted or unsubstituted organic group having from 1 to 20 carbon atoms, and the two Ys may be linked to each other to form a ring structure. The formed ring structure may be a bicyclo structure. The boron atom in the substituent may be further coordinated with a ligand. Details of the ligand are the same as the details of the ligand of the boron atom in Formula (21) described below.

When $R^{22}$ is a boron-containing group, a boron atom in the boron-containing group is bonded to the boron atom in Formula (21). Examples of the boron-containing group represented by $R^{22}$ include —$BZ_2$, wherein each Z is independently a hydrogen atom, a chlorine atom, a bromine atom, an iodine atom, or a substituted or unsubstituted organic group having from 1 to 20 carbon atoms, and two Zs may be linked to each other to form a ring structure. A boron atom in the boron-containing group may be further coordinated with a ligand. Details of the ligand are the same as the details of the ligand of the boron atom in Formula (21) described below.

$A^1$ represents a hydrogen atom, a chlorine atom, a bromine atom, or an iodine atom, preferably a hydrogen atom, a bromine atom, or an iodine atom, more preferably a hydrogen atom or an iodine atom, and further preferably a hydrogen atom.

The boron atom in Formula (21) may be further coordinated with a ligand. In other words, in addition to the three covalent bonds to the boron atom in Formula (21), there may be a ligand bonded to the boron atom by a coordinate bond. For example, in a complex such as the borane-tetrahydrofuran complex described below, ease of handling tends to be improved when $BH_3$ is stabilized by a ligand. Further, the coordination of a ligand facilitates generation of a boron radical.

Examples the ligand include a ligand having a nitrogen atom or an oxygen atom at the site of the coordination, and having a hydrogen atom or a substituted or unsubstituted organic group having from 1 to 20 carbon atoms independently bonded to each of the binding sites of the nitrogen atom or the oxygen atom. When there are plural substituted or unsubstituted organic groups having from 1 to 20 carbon atoms, these organic groups may be linked together to form a ring structure.

Examples of such a ligand include tetrahydrofuran, pyridine, trimethylamine, triethylamine, and tetramethylethylenediamine.

From the viewpoints of the abstraction rate of $A_1$ from the boron atom and ease of handling, examples of a preferred aspect of the compound represented by Formula (21) include an aspect in which $A_1$ is a hydrogen atom and a boron atom has a ligand, or an embodiment in which $A_1$ is an iodine atom.

In one aspect, Formula (21) may be a compound represented by the following Formula (21a).

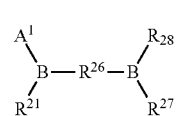

(21a)

In Formula (21a), $A^1$ and $R^{21}$ are the same as $A^1$ and $R^{21}$ in Formula (21), respectively. $R^{26}$ represents a substituted or unsubstituted divalent organic group, each of $R^{27}$ and $R^{28}$ independently represents a hydrogen atom, a chlorine atom, a bromine atom, an iodine atom, or a substituted or unsubstituted organic group, and the total number of carbon atoms of $R^{26}$ to $R^{28}$ is from 1 to 20. Each of the two boron atoms in Formula (21a) may independently be further coordinated with a ligand.

In Formula (21a), $R^{26}$ is preferably a substituted or unsubstituted divalent organic group having from 1 to 10 carbon atoms, and more preferably a substituted or unsubstituted divalent organic group having from 1 to 6 carbon atoms. Each of $R^{27}$ and $R^{28}$ is independently, preferably, a hydrogen atom or a substituted or unsubstituted organic group having from 1 to 15 carbon atoms, and more preferably a hydrogen atom or a substituted or unsubstituted organic group having from 1 to 10 carbon atoms. Details of the ligand are the same as the details of the ligand of the boron atom in Formula (21).

In a further aspect, Formula (21) may be a compound represented by Formula (21b) below.

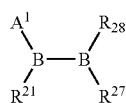

(21b)

In Formula (21b), $A^1$ and $R^{21}$ are the same as $A^1$ and $R^{21}$ in Formula (21), respectively, and each of $R^{29}$ and $R^{30}$ independently represents a hydrogen atom, a chlorine atom, a bromine atom, an iodine atom, or a substituted or unsubstituted organic group, and the total number of carbon atoms of $R^{29}$ and $R^{30}$ is from 1 to 20. Each of the two boron atoms in Formula (21b) may independently be further coordinated with a ligand.

In Formula (21b), each of $R^{29}$ and $R^{30}$ is independently, preferably, a hydrogen atom or a substituted or unsubstituted organic group having from 1 to 15 carbon atoms, and more preferably a hydrogen atom or a substituted or unsubstituted organic group having from 1 to 10 carbon atoms. Details of the ligand are the same as the details of the ligand of the boron atom in Formula (21).

In one aspect, plural compounds represented by Formula (21) may be assembled to form a multimer, for example, a dimer.

Examples of the compound represented by Formula (21) include 9-borabicyclo[3.3.1]nonane, 9-iodo-9-borabicyclo [3.3.1]nonane, borane-tetrahydrofuran complex, borane-pyridine complex, borane-trimethylamine complex, borane-triethylamine complex, pinacol borane, catecholborane, isopinocampheylborane-tetramethylethylenediamine complex, and boron triiodide. Among them, preferably used compounds include at least one selected from the group consisting of 9-borabicyclo[3.3.1]nonane, 9-iodo-9-borabicyclo[3.3.1]nonane, and boron triiodide. One kind of the compound represented by Formula (21) may be used singly, or two or more kinds thereof may be used in combination.

(Compound Represented by Formula (22))

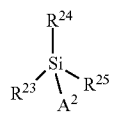

(22)

In Formula (22), each of $R^{23}$ and $R^{24}$ independently represents a hydrogen atom, an iodine atom, or a substituted or unsubstituted organic group having from 1 to 20 carbon atoms, and $R^{25}$ represents a hydrogen atom, an iodine atom, a substituted or unsubstituted organic group having from 1 to 20 carbon atoms, or a silicon-containing group, wherein a silicon atom in the silicon-containing group is bonded to the silicon atom in Formula (22), with the proviso that not all of $R^{23}$ to $R^{25}$ are hydrogen atoms. Two or more of $R^{23}$, $R^{24}$, and $R^{25}$ may be linked to form a ring structure. $A^2$ represents a hydrogen atom, a chlorine atom, a bromine atom, or an iodine atom.

In the reaction system, a radical on the silicon atom generated by abstraction of $A^2$ from the compound represented by Formula (22) abstracts iodine from the halogen-containing organic iodine compound.

The substituted or unsubstituted organic group having from 1 to 20 carbon atoms represented by each of $R^{23}$, $R^{24}$, and $R^{25}$ is independently, preferably, a substituted or unsubstituted organic group having from 1 to 15 carbon atoms, and more preferably a substituted or unsubstituted organic group having from 1 to 10 carbon atoms. Examples of the organic group include a saturated or unsaturated hydrocarbon group, and —OR (R is a substituted or unsubstituted hydrocarbon group having from 1 to 20 carbon atoms, preferably a substituted or unsubstituted hydrocarbon group having from 1 to 15 carbon atoms, and more preferably a substituted or unsubstituted hydrocarbon group having from 1 to 10 carbon atoms).

As the substituted or unsubstituted organic group having from 1 to 20 carbon atoms represented by each of $R^{23}$, $R^{24}$, and $R^{25}$, an organic group having a carbon atom bonded to the silicon atom is preferable. Furthermore, said carbon atom is preferably an sp2 carbon atom or an sp3 carbon atom. This facilitates generation of a silicon radical and increases the ability of the radical to abstract iodine. From these viewpoints, as the substituted or unsubstituted organic group having from 1 to 20 carbon atoms represented by each of $R^{23}$, $R^{24}$, and $R^{25}$, a substituted or unsubstituted alkyl group or a substituted or unsubstituted aryl group is preferable.

When the substituted or unsubstituted organic groups having from 1 to 20 carbon atoms represented by each of $R^{23}$, $R^{24}$, and $R^{25}$ has a substituent, examples of the substituent include a group containing a silicon atom. Examples of the group containing a silicon atom include —$SiY_3$, wherein each Y is independently a hydrogen atom, a chlorine atom, a bromine atom, an iodine atom, or a substituted or unsubstituted organic group having from 1 to 20 carbon atoms, and plural Ys may be linked together to form a ring structure.

When $R^{25}$ is a silicon-containing group, a silicon atom of the silicon-containing group is bonded to the silicon atom in Formula (22). Examples of the silicon-containing group represented by $R^{25}$ include —$SiZ_3$, wherein each Z is independently a hydrogen atom, a chlorine atom, a bromine atom, an iodine atom, or a substituted or unsubstituted organic group having from 1 to 20 carbon atoms, and plural Zs may be linked to each other to form a ring structure.

In one aspect, from the viewpoints of the stability and ease of handling of the catalyst, each of $R^{23}$, $R^{24}$, and $R^{25}$ independently, preferably, has an aromatic ring. From this viewpoint, in one preferable aspect, each of $R^{23}$, $R^{24}$, and $R^{25}$ may independently be a substituted or unsubstituted phenyl group.

From the viewpoint of polymerization reactivity of the catalyst, each of $R^{23}$, $R^{24}$, and $R^{25}$ may have an aromatic ring, and may not have an aromatic ring.

$A^2$ represents a hydrogen atom, a chlorine atom, a bromine atom, or an iodine atom, and more preferably represents a hydrogen atom.

In one aspect, from the viewpoints of the abstraction rate of $A^2$ from the Si-$A^2$ bond and ease of handling, the compound represented by Formula (22) is preferably a compound in which $A^2$ is a hydrogen atom and at least one selected from the group consisting of $R^{23}$, $R^{24}$, and $R^{25}$ has an aromatic ring.

In one aspect, Formula (22) may be a compound represented by the following Formula (22a).

In Formula (22a), $A^2$, $R^{23}$, and $R^{24}$ are the same as $A^2$, $R^{23}$, and $R^{24}$ in Formula (22), respectively. $R^{31}$ represents a substituted or unsubstituted divalent organic group, and each of $R^{32}$, $R^{33}$, and $R^{34}$ independently represents a hydrogen atom, a chlorine atom, a bromine atom, an iodine atom, a substituted or unsubstituted organic group having from 1 to 20 carbon atoms, wherein the total number of carbon atoms of $R^{31}$ to $R^{34}$ is from 1 to 20.

In Formula (22a), $R^{31}$ is preferably a substituted or unsubstituted divalent organic group having from 1 to 10 carbon atoms, and more preferably a substituted or unsubstituted divalent organic group having from 1 to 6 carbon atoms. Each of $R^{32}$, $R^{33}$, and $R^{34}$ is independently, preferably, a hydrogen atom or a substituted or unsubstituted organic group having from 1 to 15 carbon atoms, and preferably a hydrogen atom or a substituted or unsubstituted organic group having from 1 to 10 carbon atoms. From the viewpoint of the stability and ease of handling of the catalyst, at least one, preferably two or more, and more preferably two, selected from the group consisting of $R^{32}$, $R^{33}$, and $R^{34}$ has an aromatic ring. Examples of a preferable aspect of $R^{32}$, $R^{33}$, and $R^{34}$ include an aspect in which each of $R^{32}$ and $R^{33}$ is independently a substituted or unsubstituted phenyl group, and $R^{34}$ is a hydrogen atom.

In a further aspect, Formula (22) may be a compound represented by Formula (22b) below.

In Formula (22b), $A^2$, $R^{23}$ and $R^{24}$ are the same as $A^2$, $R^{23}$ and $R^{24}$ in Formula (22), respectively, and each of $R^{35}$ to $R^{37}$ independently represents a hydrogen atom, a chlorine atom, a bromine atom, an iodine atom, or a substituted or unsubstituted organic group, and the total number of carbon atoms in $R^{35}$ to $R^{37}$ is from 1 to 20.

In Formula (22b), each of $R^{35}$ to $R^{37}$ is independently preferably a hydrogen atom or a substituted or unsubstituted organic group having from 1 to 15 carbon atoms, and more preferably a hydrogen atom or a substituted or unsubstituted organic group having from 1 to 10 carbon atoms.

Examples of the compound represented by Formula (22) include 1,4-bis(dimethylsilyl)benzene, 1,1,2,2-tetraphenyldisilane, phenylsilane, di-tert-butyl silane, tri-tert-butylsilane, diphenylsilane, trimethylsilane, tert-butyldimethylsilane, di-tert-butylmethylsilane, dimethylphenylsilane, diphenylmethylsilane, tert-butyl diphenylsilane, triphenylsilane, and silicon tetraiodide. Among them, from the viewpoints of the abstraction rate of $A^2$ from the Si-$A^2$ bond and ease of handling, compounds that are preferably used include 1,4-bis(dimethylsilyl)benzene, 1,1,2,2-tetraphenyldisilane, dimethylphenylsilane, diphenylmethylsilane, tert-butyl diphenylsilane, and triphenylsilane. From the viewpoint of the abstraction rate of $A^2$ from the Si-$A^2$ bond, examples thereof include trimethylsilane, tri-tert-butylsilane, and tert-butyldimethylsilane. One kind of the compound represented by Formula (22) may be used singly, or two or more kinds thereof may be used in combination.

The addition amounts of the compound represented by Formula (21) and the compound represented by Formula (22) may be adjusted as necessary. From the viewpoint of obtaining a halogen-containing polymer with favorably controlled molecular weight distribution, the at least one selected from the group consisting of the compound represented by Formula (21) and the compound represented by Formula (22) is used in an amount of preferably from 0.01 mol to 100 mol, more preferably from 0.1 mol to 50 mol, further preferably from 0.2 mol to 10 mol, and particularly preferably from 0.3 mol to 1.0 mol, with respect to 1 mol of the Compound (10).

<Compound (10)>

The Compound (10) is a halogen-containing organic iodine compound having the substructure represented by the following Formula (1).

In Formula (1), * represents a binding site bonded to an organic group. X represents a fluorine atom or a chlorine atom. $X^1$ represents a hydrogen atom, a fluorine atom, a chlorine atom, a bromine atom, an iodine atom, or —$CX^5X^6X^7$. Each of $X^5$ to $X^7$ independently represents a hydrogen atom, a fluorine atom, or a chlorine atom. Hereinafter, the substructure represented by Formula (1) is also referred to as Substructure (1).

From the viewpoints of the abstraction rate of an iodine atom and the addition reaction rate of the resulting carbon-centered radical, X is preferably a fluorine atom.

From the viewpoints of the abstraction rate of an iodine atom and the addition reaction rate of the resulting carbon-centered radical, $X^1$ is preferably a hydrogen atom or a fluorine atom.

The Compound (10) only needs to have the above-described Substructure (1), and the overall structure of the compound is not limited by any means. In other words, the organic group to which * is bonded is not limited to a hydrocarbon group, and may be any functional group, such as a hydroxyl group or an amino group, a halogeno group (halogen atom), or a hydrogen atom. The organic group may contain a heteroatom, and the valence and molecular weight of the organic group are not particularly limited.

The number of Substructure(s) (1) in the Compound (10) is not particularly limited. For example, the Compound (10) may be a monoiodo halogen-containing organic compound having one Substructure (1), a diiodo halogen-containing organic compound having two Substructures (1), or a polyiodide halogenated organic compound having three or more Substructures (1).

For example, the Compound (10) may be a monoiodo halogen-containing organic compound to which a substituted or unsubstituted alkyl group, or a halogen atom or a hydrogen atom, are bonded at *.

Compound (10) may be a diiodo halogen-containing organic compound to which a divalent organic group, such as a substituted or unsubstituted alkylene group or an ether bond, and Substructure (1) that is bonded to the divalent organic group, are bonded at *.

(Monoiodo Halogen-Containing Organic Compound)

In the Compound (10), the monoiodo halogen-containing organic compound may be a compound having the structure represented by the following formula. In the formula, $R^{10}$ represents a substituted or unsubstituted alkyl group, a substituted or unsubstituted aryl group, a substituted or unsubstituted arylalkyl group, a hydrogen atom, a fluorine atom, or a chlorine atom. X represents a fluorine atom or a chlorine atom. $X^{20}$ represents a hydrogen atom, a fluorine atom, a chlorine atom, a bromine atom, or $-CX^5X^6X^7$, wherein each of $X^5$ to $X^7$ independently represents a hydrogen atom, a fluorine atom, or a chlorine atom.

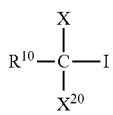

In the formula, X is preferably a fluorine atom.
In the formula, $X^{20}$ is preferably a hydrogen atom or a fluorine atom.

As the substituted or unsubstituted alkyl group represented by $R^{10}$, a substituted or unsubstituted linear, branched, or cyclic alkyl group having from 1 to 7 carbon atoms is preferable.

Examples of the alkyl group having from 1 to 7 carbon atoms include a methyl group, an ethyl group, an n-propyl group, an isopropyl group, an n-butyl group, a sec-butyl group, a tert-butyl group, an n-pentyl group, an n-hexyl group, a cyclohexyl group, and an n-heptyl group. Among them, a linear or branched alkyl group having from 1 to 4 carbon atoms is more preferable, and a methyl group or an ethyl group is further preferable.

Examples of the substituted alkyl group having from 1 to 7 carbon atoms include an alkyl group having a substituent, such as a fluorine atom, a chlorine atom, an alkoxy group, or a fluoroalkoxy group, at a freely-selected position. Among them, an alkyl group having from 2 to 15 fluorine atoms is more preferable, a perfluoroalkyl group is further preferable from the viewpoint of suppressing abstraction reactions of hydrogen atoms by radicals, a perfluoroalkyl group having from 1 to 6 carbon atoms is further preferable, and a perfluoroalkyl group having from 1 to 4 carbon atoms is particularly preferable from the viewpoint of minimizing bioaccumulation.

In other words, when $R^{10}$ is a substituted alkyl group, the compound represented by the following Formula (11) is preferable as the Compound (10).

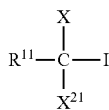

(11)

In the formula, $R^{11}$ represents a perfluoroalkyl group having from 1 to 4 carbon atoms, X represents a fluorine atom or a chlorine atom, and $X^{21}$ represents a hydrogen atom, a fluorine atom, a chlorine atom, a bromine atom, or $-CX^{24}X^{25}X^{26}$, wherein each of $X^{24}$ to $X^{26}$ independently represents a hydrogen atom, a fluorine atom, or a chlorine atom.

In the formula, X is preferably a fluorine atom.
In the formula, $X^{21}$ is preferably a hydrogen atom or a fluorine atom.

As an aryl group represented by $R^{th}$, an aryl group having from 6 to 12 carbon atoms and a heteroaryl group having from 3 to 12 carbon atoms are preferable, and specifically, a phenyl group, a naphthyl group, a pyridyl group, a pyrrole group, a furyl group, and a thienyl group are more preferable.

In $R^{10}$, as an arylalkyl group, an arylalkyl group having from 7 to 15 carbon atoms and a heteroarylalkyl group having from 4 to 15 carbon atoms are preferable, and specifically, a benzyl group, a 2-pyridylmethyl group, a 3-pyridylmethyl group, and a 4-pyridylmethyl group are more preferable.

Specific examples of the monoiodo halogen-containing organic compound include difluoroiodomethane, trifluoroiodomethane, chlorodifluoroiodomethane, 1,1-difluoroethyl iodide, 1,1-difluoro-n-propyl iodide, 1,1-difluoro-n-butyl iodide, 1,1-difluoro-isobutyl iodide, 1,1-difluoro-n-pentyl iodide, sec-butyldifluoromethylene iodide, tert-butyldifluoromethylene iodide, 1,1-difluoro-n-hexyl iodide, 1,1-difluoro-n-heptyl iodide, 1,1-difluoro-n-octyl iodide, cyclohexyldifluoromethylene iodide, $C_2F_5I$, $CHF_2CF_2I$, $CF_3CF_2CF_2I$, $(CF_3)_2CFI$, $CF_3(CF_2)_3I$, $(CF_3)_2CFCF_2I$, $CF_3(CF_2)_4I$, $CF_3(CF_2)_5I$, 1,2-dichloro-1,1,2-trifluoroethyl iodide, 1-chloro-1-iodotetrafluoroethane, and chloroiodoacetic acid.

The monoiodo halogen-containing organic compound can be produced by conventionally known methods, for example, by a reaction of I2 with a radical generator such as $(R^{10}CF_2C(=O)O)_2$.

(Diiodo Halogen-Containing Organic Compound)

In the Compound (10), the diiodo halogen-containing organic compound may be a compound having the structure represented by the following formula. In the formula, $R^{10'}$ represents a single bond, a substituted or unsubstituted alkylene group, a substituted or unsubstituted arylene group, a substituted or unsubstituted arylene alkylene group, or a substituted or unsubstituted alkylene arylene alkylene group. X represents a fluorine atom or a chlorine atom. Each $X^{20}$ independently represents a hydrogen atom, a fluorine atom, a chlorine atom, a bromine atom, or $-CX^5X^6X^7$, wherein each of $X^5$ to $X^7$ independently represents a hydrogen atom, a fluorine atom, or a chlorine atom.

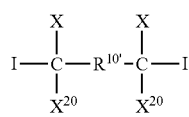

From the viewpoint of the abstraction rate of an iodine atom and the addition reaction rate of the resulting carbon-centered radical, X is preferably a fluorine atom.

From the viewpoint of the abstraction rate of an iodine atom and the addition reaction rate of the resulting carbon-centered radical, each $X^{20}$ is independently, preferably, a hydrogen atom or a fluorine atom.

As the substituted or unsubstituted alkylene group represented by $R^{10'}$, a substituted or unsubstituted linear, branched, or cyclic alkylene group having from 1 to 6 carbon atoms is preferable.

Examples of the alkylene group having from 1 to 6 carbon atoms include a methylene group, an ethylene group, an n-propylene group, an isopropylene group, an n-butylene group, an isobutylene group, an n-pentylene group, an n-hexylene group, and a 1,4-cyclohexylene group. Among them, a linear or branched alkylene group having from 1 to 4 carbon atoms is more preferable, and an ethylene group is further preferable.

Examples of the substituted alkylene group having from 1 to 6 carbon atoms include an alkylene group having a substituent such as a fluorine atom, a chlorine atom, an alkoxy group, or a fluoroalkoxy group at a freely-selected position. Among them, an alkylene group having from 2 to 12 fluorine atoms is more preferable, a perfluoroalkylene group is further preferable from the viewpoint of suppressing abstraction reactions of hydrogen atoms by radicals, a perfluoroalkylene group having from 1 to 4 carbon atoms is further preferable, and a perfluoroalkylene group having from 2 to 4 carbon atoms is particularly preferable.

In other words, Compound (10) is a compound represented by the following formula (12) when $R^{10'}$ is a perfluoroalkylene group having from 1 to 4 carbon atoms.

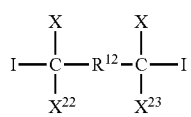

(12)

In the formula, $R^{12}$ represents a perfluoroalkylene group having from 1 to 4 carbon atoms. X represents a fluorine atom or a chlorine atom. Each of $X^{22}$ and $X^{23}$ independently represents a hydrogen atom, a fluorine atom, a chlorine atom, a bromine atom, or $-CX^{24}X^{25}X^{26}$, and each of $X^{24}$ to $X^{26}$ independently represents a hydrogen atom, a fluorine atom, or a chlorine atom.

In the formula, each X is independently, preferably, a fluorine atom.

In the formula, each of $X^{22}$ and $X^{23}$ is independently, preferably, a hydrogen atom or a fluorine atom.

As the arylene group represented by $R^{10'}$, an arylene group having from 6 to 12 carbon atoms and a heteroarylene group having from 3 to 12 carbon atoms are preferable. Specifically, a 1,2-phenylene group, a 1,3-phenylene group, a 1,4-phenylene group, a 4,4'-biphenylene group, a 2,2'-biphenylene group, a 2,6-naphthylene group, a 2,7-naphthylene group, a 2,4-pyridylene group, a 2,5-pyridylene group, a 2,6-pyridylene group, a pyrrolene group, a frirene group, a thienylene group, and a 1,5-furandiyl group are more preferable.

As the arylene alkylene group represented by $R^{10'}$, an arylene alkylene group having from 7 to 15 carbon atoms and a heteroarylene alkylene group having from 4 to 15 carbon atoms are preferable. Specifically, a benzylene group, a 2-pyridylenemethylene group, a 3-pyridylenemethylene group, and a 4-pyridylenemethylene group are more preferable.

As the alkylenearylene alkylene group represented by $R^{10'}$, an alkylenearylene alkylene group having from 8 to 18 carbon atoms and an alkyleneheteroarylene alkylene group having from 5 to 18 carbon atoms are preferable. Specifically, a 1,2-dimethylenephenylene group, a 1,3-dimethylenephenylene group, a 1,4-dimethylenephenylene group, a 2,2'-dimethylenebiphenylene group, a 2,4-dimethylenepyridylene group, a 2,5-dimethylenepyridylene group, a 2,6-dimethylenepyridylene group, and a 1,5-dimethylfurandiyl group are more preferable.

Specific examples of the diiodo halogen-containing organic compound include 1,2-diiodotetrafluoroethane, 1,4-diiodooctafluorobutane, and 1,6-diiodododecafluorohexane.

Among them, from the viewpoint of being a low-volatility liquid that is easy to handle, 1,4-diiodooctafluorobutane is preferable.

The production method of the diiodo halogen-containing organic compound is not particularly limited, and the diiodo halogen-containing organic compound can be obtained by conventionally known methods.

(Polyiodide Halogen-Containing Organic Compound)

In the Compound (10), the polyiodide halogen-containing organic compound has three or more Substructures (1). In the Compound (10), examples of the polyiodide halogen-containing organic compound include one in which the organic group bonded to * of the Substructure (1) contains a substructure of a fluorine-containing polymer, such as an unvulcanized fluoroelastomer, or a substructure of a polysiloxane, and in which the Compound (10) has three or more substructures (1). The expression that "an organic group bonded to * of the Substructure (1) contains a substructure of a polysiloxane" means, for example, that the Substructure (1) is bonded to a polysiloxane via a divalent bonding group such as a substituted or unsubstituted alkylene group and an ether bond. The polysiloxane may be a silicone or a product resulting from a condensation reaction of a silane coupling agent.

The polyiodide halogen-containing organic compound can be produced by conventional known methods.

The Compound (10) may be a compound containing plural units represented by the following Formula (4). When the Compound (10) contains plural units represented by the following Formula (4), the fluorine content of the Compound (10) is preferably 50% by mass or more, and more preferably 60% by mass or more, from the viewpoints of heat resistance and flame retardance. The fluorine content of a compound is determined by combustion ion chromatography.

(4)

In the formula, each of $X^{31}$ to $X^{34}$ independently represents a hydrogen atom, a fluorine atom, a chlorine atom, a bromine atom, an iodine atom, or $-CX^{35}X^{36}X^{37}$, and each of $X^{35}$ to $X^{37}$ independently represents a hydrogen atom, a fluorine atom, or a chlorine atom.

The amount of the Compound (10) used in the production method according to the present disclosure is not particularly limited. In one aspect, the Compound (10) is used in an amount of preferably from 0.0001 mol to 3 mol, more preferably from 0.001 mol to 2 mol, and further preferably from 0.002 mol to 1 mol, with respect to 1 mol of the compound represented by Formula (3).

The Compound (10) is preferably at least one selected from the group consisting of a monoiodo halogen-containing organic compound and a diiodo halogen-containing organic compound, and is preferably at least one selected from the group consisting of a compound represented by Formula (11) and a compound represented by Formula (12).

When a monoiodo halogen-containing organic compound and a diiodo halogen-containing organic compound are used together as the Compound (10), the diiodo halogen-containing organic compound is used in an amount of preferably 0.01 mol or more, more preferably 0.05 mol or more, and further preferably 0.1 mol or more, with respect to 1 mol of the monoiodo halogen-containing organic compound. Further, the diiodo halogen-containing organic compound is used in an amount of preferably 100 mol or less, more preferably 10 mol or less, and further preferably by 5 mol or less, with respect to 1 mol of the monoiodo halogen-containing organic compound.

<Compound Represented by Formula (3)>

The compound represented by Formula (3) is a compound that is added to the Compound (10) having the substructure represented by Formula (1) by the production method according to the present disclosure.

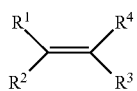

(3)

In Formula (3), each of $R^1$ to $R^4$ independently represents a hydrogen atom, a fluorine atom, a chlorine atom, a bromine atom, an iodine atom, or a substituted or unsubstituted organic group having from 1 to 40 carbon atoms. $R^1$ and $R^4$ or $R^2$ and $R^3$ may be linked to form a ring structure.

The number of carbon atoms of the substituted or unsubstituted organic group having from 1 to 40 carbon atoms represented by each of $R^1$ to $R^4$ is preferably from 1 to 30, more preferably from 1 to 20, and further preferably from 1 to 12. The organic group may be linear, branched, or cyclic, and may or may not include an unsaturated bond. Furthermore, the organic group may or may not include a heteroatom, and may include a heteroatom in a main chain of a substituent.

Examples of the substituted or unsubstituted organic group having from 1 to 40 carbon atoms include an alkyl group, an aryl group, a heteroaryl group, an aryloxy group, a heteroaryloxy group, an alkoxy group, an arylalkyl group, a heteroarylalkyl group, an arylalkoxy group, a heteroarylalkoxy group, a carboxy group, an alkoxycarbonyl group, a carbamoyl group, an acylamino group, an acyloxy group, and a cyano group.

When the substituted or unsubstituted organic group having from 1 to 40 carbon atoms is a hydrocarbon group that may contain a heteroatom, such as an alkyl group, an aryl group, a heteroaryl group, an aryloxy group, a heteroaryloxy group, an alkoxy group, an arylalkyl group, a heteroarylalkyl group, an arylalkoxy group, or a heteroarylalkoxy group, said hydrocarbon group may be linear, branched, or cyclic, and may or may not include an unsaturated bond.

Examples of the acyl group of the acylamino group or the acyloxy group include a group having a structure in which a hydroxy group is removed from a carboxylic acid or a sulfonic acid.

Examples of the organic group having from 1 to 40 carbon atoms and having a substituent include a substituted alkyl group, a substituted alkoxy group, a substituted alkoxycarbonyl group, and an N-substituted carbamoyl group. The number of substituent(s) may be one, two or more.

Examples of the substituent of the substituted alkyl group include a fluorine atom, a chlorine atom, a hydroxy group, an alkoxy group, an amino group, a carboxylic acid group, a sulfonic acid group, and a 1,3,5-triazine trione skeleton.

Examples of the substituent of the substituted alkoxy group include a fluorine atom, a hydroxy group, and an amino group.

Examples of the substituent of the substituted alkoxycarbonyl group include a fluorine atom, a hydroxy group, and an amino group.

Examples of the substituent of the N-substituted carbamoyl group include an alkyl group and an alkoxyalkyl group.

In Formula (3), $R^1$ and $R^4$ or $R^2$ and $R^3$ may be linked to form a ring structure. In other words, the compound represented by Formula (3) may be a compound having a ring structure, such as maleic anhydride or itaconic anhydride.

From the viewpoints of reducing steric hindrance in the extension reaction and facilitating the reaction, the compound represented by Formula (3) is preferably a compound in which at least two of $R^1$ to $R^4$ are selected from the group consisting of a hydrogen atom, a fluorine atom, a chlorine atom, and a methyl group.

The compound represented by Formula (3) may be a compound having one reactive carbon-carbon double bond or a compound having plural reactive carbon-carbon double bonds. Therefore, the compound represented by Formula (3) may be a diallyl compound, such as diallylamine, or a triallyl compound, such as triallyl isocyanurate.

Examples of the compound represented by Formula (3) include: a (meth)acrylic ester monomer, such as methyl (meth)acrylate, ethyl (meth)acrylate, propyl (meth)acrylate, butyl (meth)acrylate, octyl (meth)acrylate, lauryl (meth) acrylate, or hydroxyethyl methacrylate; a cycloalkyl group-containing unsaturated monomer, such as cyclohexyl (meth) acrylate, methylcyclohexyl (meth)acrylate, isobornyl (meth) acrylate, or cyclodododecyl (meth)acrylate; a carboxyl group-containing unsaturated monomer, such as (meth) acrylic acid, maleic acid, fumaric acid, itaconic acid, citraconic acid, crotonic acid, maleic anhydride, or itaconic anhydride; a tertiary amine-containing unsaturated monomer, such as N,N-dimethylaminopropyl(meth)acrylamide, N,N-dimethylaminoethyl(meth)acrylamide, 2-(dimethyl amino)ethyl(meth)acrylate, or N,N-dimethylaminopropyl (meth)acrylate; a quaternary ammonium base-containing unsaturated monomer, such as N-2-hydroxy-3-acryloyloxypropyl-N,N,N-trimethylammonium chloride or N-methacryloylaminoethyl-N,N,N-dimethylbenzylammonium chloride; an epoxy group-containing unsaturated monomer, such as glycidyl (meth)acrylate; a styrene monomer, such as styrene, α-methylstyrene, 4-methylstyrene, 2-methyl styrene, 3-methyl styrene, 4-methoxystyrene, 2-hydroxymethylstyrene, 2-chlorostyrene, 4-chlorostyrene, 2,4-dichlorostyrene, 1-vinylnaphthalene, divinylbenzene, 4-(chloromethyl)styrene, 2-(chloromethyl)styrene, 3-(chloromethyl)styrene, 4-styrenesulfonic acid, or an alkali metal salt thereof (e.g., a sodium salt, or a potassium salt); a heterocyclic unsaturated monomer, such as 2-vinylthiophene or N-methyl-2-vinylpyrrole; a vinylamide, such as N-vinylformamide or N-vinylacetamide; an α-olefin, such as diallylamine, triallyl isocyanurate, tri(2-methyl-allyl)isocyanurate, ethylene, propylene, 1-butene, isobutene, 1-hexene, 1-octene, 1-decene, vinyl fluoride, vinylidene fluoride, trifluoroethylene, chlorotrifluoroethylene, tetrafluoroethylene, hexafluoropropylene, 2,3,3,3-tetrafluoropropylene, vinylidene chloride, vinyl chloride, 1-chloro-1-fluoroethylene, or 1,2-dichloro-1,2-difluoroethylene, 1H,1H,2H-perfluoro(n-1-hexene), or 1H,1H, 2H-perfluoro(n-1-octene), a vinyl ester monomer, such as vinyl acetate; a divinylfluoroalkane, such as 1,4-divinyl octafluorobutane or 1,6-divinyldodecafluorohexane; an acrylonitrile; an acrylamide monomer, such as acrylamide or N,N-dimethylacrylamide; an alkyl vinyl ether, such as methyl vinyl ether, ethyl vinyl ether, butyl vinyl ether, t-butyl vinyl ether, cyclohexyl vinyl ether, hydroxyethyl vinyl ether, or hydroxy butyl vinyl ether; and a perfluoro (alkyl vinyl ether), such as perfluoro(methyl vinyl ether), perfluoro(ethyl vinyl ether), or perfluoro(n-propyl vinyl ether). One kind of the compound represented by Formula (3) may be used singly, or two or more kinds thereof may be used in combination.

In a preferable aspect, in Formula (3), each of $R^1$ to $R^4$ independently represents a hydrogen atom, a chlorine atom, a bromine atom, an iodine atom, or a substituted or unsubstituted organic group having from 1 to 40 carbon atoms and having at least one reactive carbon-carbon double bond, and $R^1$ and $R^4$ or $R^2$ and $R^3$ may be linked to form a ring structure, and Formula (3) has at least two reactive carbon-carbon double bonds. The compound represented by Formula (3) in this case is also referred to as a "compound represented by Formula (3) containing at least two reactive carbon-carbon double bonds". By reacting the compound represented by Formula (3) having at least two reactive carbon-carbon double bonds with, for example, a fluorine-containing polymer having a C—I bond or a chlorine-containing polymer having a C—I bond, a cross-linked structure can be introduced into the fluorine-containing polymer or the chlorine-containing polymer.

In the substituted or unsubstituted organic group having from 1 to 40 carbon atoms and having at least one reactive carbon-carbon double bond in the compound represented by Formula (3) having at least two reactive carbon-carbon double bonds, the number of reactive carbon-carbon double bond(s) is preferably from 1 to 5, more preferably from 1 to 4, and further preferably from 1 to 3.

The number of carbon atoms of the substituted or unsubstituted organic group having from 1 to 40 carbon atoms in the compound represented by Formula (3) having at least two reactive carbon-carbon double bonds is preferably from 1 to 30, and more preferably from 1 to 20. The organic group may be linear, branched, or cyclic, and may or may not contain an unsaturated bond. Furthermore, the organic group may or may not contain a heteroatom, and may contain a heteroatom in a main chain of a substituent.

Specific examples of the compound represented by Formula (3) having at least two reactive carbon-carbon double bonds include diallylamine, 1,4-divinyl octafluorobutane, 1,6-divinyldodecafluorohexane, triallyl isocyanurate, tri(2-methyl-allyl)isocyanurate, divinylbenzene, and a fluorine-containing compound having two maleimide groups.

In a further preferable aspect, the compound represented by Formula (3) includes a compound represented by the following Formula (5).

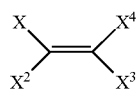

(5)

In Formula (5), X represents a fluorine atom or a chlorine atom, each of $X^2$ to $X^4$ independently represents a hydrogen atom, a fluorine atom, a chlorine atom, a bromine atom, an iodine atom, or $-CX^5X^6X^7$, and each of $X^5$ to $X^7$ independently represents a hydrogen atom, a fluorine atom, or a chlorine atom.

In Formula (5), when only one of $X^2$ to $X^4$ is $-CX^5X^6X^7$, Formula (5) has a propylene structure. In this case, from the viewpoint of reactivity, it is preferable that $X^3$ or $X^4$ is $-CX^5X^6X^7$, and it is more preferable that $X^3$ is $-CX^5X^6X^7$.

Each of $X^2$ to $X^4$ is also preferably, independently, a hydrogen atom, a fluorine atom, a chlorine atom, a bromine atom, or an iodine atom.

Examples of the compound represented by Formula (5) include vinyl fluoride, vinylidene fluoride, trifluoroethylene, chlorotrifluoroethylene, bromotrifluoroethylene, iodotrifluoroethylene, tetrafluoroethylene, hexafluoropropylene, 1,3,3,3-tetrafluoropropylene, 2,3,3,3-tetrafluoropropylene, 1-chloro-1-fluoroethylene, 1-bromo-1-fluoroethylene, 1-iodo fluoroethylene, 1,1-dibromo-2,2-difluoroethylene, 1,1-difluoro-2,2-diiodoethylene, 1,2-dichloro-1,2-difluoroethylene, 1,2-dibromo-1,2-difluoroethylene, 1,2-difluoro-1,2-diiodoethylene, vinyl chloride, and vinylidene chloride.

As the compound represented by Formula (5), from the viewpoint of polymerization reactivity when obtaining a polymer, vinylidene fluoride, trifluoroethylene, chlorotrifluoroethylene, tetrafluoroethylene, hexafluoropropylene, 2,3,3,3-tetrafluoropropylene, vinyl chloride, or vinylidene chloride is preferable.

<Other Optional Components>

In the production method according to the present disclosure, another component, such as a radical initiator other than the Compound (10), a solvent, an emulsifier, a suspension aid, an acid or an alkali, or a reaction control agent other than the compound represented by Formula (21) and the compound represented by Formula (22), may be further used.

(Radical Initiator)

In the production method according to the present disclosure, a radical initiator other than the Compound (10) may be used in combination. Examples of the radical initiator include an azo radical initiator and a peroxide radical initiator.

Examples of the azo radical initiator include 2,2'-azobis (isobutyronitrile) (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovalerianic acid) (ACVA), 1,1'-azobis(1-acetoxy-1-phenylethane), 2,2'-azobis(2-methylbutylamide), 2,2'-azobis(4-methoxy-2,4-dimethylvaleronitrile), 2,2'-azobis(2-methylamidinopropane) dihydrochloride, 2,2'-azobis[2-(2-imidazolin-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), and 2,2'-azobis(N-cyclohexyl-2-methylpropionamide).

It is preferable that these azo radical initiators are selected according to the reaction conditions.

For example, in a case of low temperature polymerization at 40° C. or lower, 2,2'-azobis(2,4-dimethylvaleronitrile) (ADVN), 2,2'-azobis(4-methoxy-2,4-dimethylvaleronitrile) or the like is preferably used.

In a case of medium-temperature polymerization at from 40 to 80° C., 2,2'-azobis(isobutyronitrile) (AIBN), 2,2'-azobis(2-methylbutyronitrile) (AMBN), dimethyl-2,2'-azobisisobutyrate (MAIB), 1,1'-azobis(1-acetoxy-1-phenylethane), 4,4'-azobis(4-cyano valerianic acid) (ACVA), 2,2'-azobis(2-methylbutylamide), 2,2'-azobis(2- methylamidinopropane) dihydrochloride, 2,2'-azobis[2-(2-imidazolin-2-yl)propane] or the like is preferably used.

In a case of high temperature polymerization at 80° C. or higher, 1,1'-azobis(1-cyclohexanecarbonitrile) (ACHN), 2-cyano-2-propylazoformamide, 2,2'-azobis(N-butyl-2-methylpropionamide), 2,2'-azobis(N-cyclohexyl-2-methylpropionamide), 2,2'-azobis(2,4,4-trimethylpentane), 2,2'-azobis[2-methyl-N-(2-hydroxyethyl)propionamide] or the like is preferably used.

As a peroxide radical initiator, from the viewpoint of ease of β-cleavage, dialkyl peroxide, diacyl peroxide, and peroxyketal are preferable, and diacyl peroxide is more preferable. These peroxide radical initiators quickly generate carbon-centered radical species by β-cleavage, and therefore, the catalytic function of the compound represented by Formula (21) and the compound represented by Formula (22) tends to be favorably exhibited.

Specific examples of the peroxide radical initiator include: a dialkyl peroxide, such as tert-butylcumyl peroxide, di-tert-butyl peroxide, or di-tert-hexyl peroxide; a diacyl peroxide, such as diisobutyryl peroxide, di(3,5,5-trimethylhexanoyl) peroxide, dilauroyl peroxide, dicuccinic acid peroxide, benzoyl peroxide, or a mixture of dibenzoyl peroxide, benzoyl m-methylbenzoyl peroxide, and m-toluoyl peroxide; and a peroxyketal, such as 2,2-bis(4,4-di-tert-butylperoxycyclohexyl)propane, 1,1-di(tert-hexylperoxy)cyclohexane, 1,1-di(tert-butylperoxy)cyclohexane, n-butyl 4,4-di(tert-butylperoxy)valerate, or 2,2-di(tert-butylperoxy)butane. In addition, fluorine-containing peroxides described in Japanese National-Phase Publication (JP-A) No. H08-506140 can also be used.

When a radical initiator other than the Compound (10) is used in combination in the reaction of the Compound (10) and the compound represented by Formula (3) in the presence of at least one selected from the group consisting of the compound represented by Formula (21) and the compound represented by Formula (22), the radical initiator other than the Compound (10) is preferably used in an amount of preferably from 0.0001 mol to 10 mol, more preferably from 0.01 mol to 5 mol, and further preferably from 0.1 mol to 2 mol, with respect to 1 mol of the Compound (10).

When an azo radical initiator or a peroxide radical initiator is used in combination in a reaction of the Compound (10) and the compound represented by Formula (3) in the presence of at least one selected from the group consisting of the compound represented by Formula (21) and the compound represented by Formula (22), the azo radical initiator or the peroxide radical initiator is preferably used in an amount of preferably from 0.0001 mol to 10 mol, more preferably from 0.01 mol to 5 mol, and further preferably from 0.1 mol to 2 mol, with respect to 1 mol of the Compound (10).

(Solvent)

In the production method according to the present disclosure, the reaction may be carried out using an organic solvent (including an ionic liquid) or an aqueous solvent.

Examples of the organic solvent include benzene, toluene, N,N-dimethylformamide (DMF), dimethyl sulfoxide (DMSO), acetone, 2-butanone (methyl ethyl ketone), dioxane, hexafluoroisopropanol, chloroform, carbon tetrachloride, tetrahydrofuran (THF), ethyl acetate, 1H-perfluorohexane, 1H,1H,1H,2H,2H-perfluorooctane, trifluoromethylbenzene, 1,3-bis(trifluoromethyl)benzene, 1,4-bis(trifluoromethyl)benzene, benzotrifluoride, chlorobenzene, and acetonitrile.

Further, an ionic liquid, such as N-methyl-N-methoxymethylpyrrolidium tetrafluoroborate, N-methyl-N-ethoxymethyl tetrafluoroborate, 1-methyl methylimidazolium tetrafluoroborate, 1-methyl-3-methylimidazolium hexafluorophosphate, or 1-methyl-3-methylimidazolium chloride, may be used.

Examples of the aqueous solvent include water, methanol, ethanol, isopropanol, n-butanol, ethyl cellosolve, butyl cellosolve, 1-methoxy-2-propanol, and diacetone alcohol.

The amount of the solvent used can be adjusted as necessary. For example, the solvent is preferably used in an amount of preferably from 0.01 L to 50 L, more preferably from 0.05 L to 10 L, and further preferably from 0.1 L to 5 L, with respect to 1,000 g of the iodine-containing compound to be obtained.

(Reaction Control Agent)

In the production method according to the present disclosure, a reaction control agent other than the compound represented by Formula (21) and the compound represented by Formula (22) may be used in combination. In particular, when $A^1$ in the compound represented by Formula (21) is a hydrogen atom, use of a nitrogen-centered coordination compound or an oxygen-centered coordination compound as a reaction control agent together with the compound represented by Formula (21) tends to enable particularly favorable controlled polymerization. Examples of the reaction control agent include: ammonia, trialkylamine, a nitrogen-containing aromatic compound, such as pyridine; and water, an alcohol, an ether, and a carbonyl group-containing compound. When a compound represented by Formula (21) in which $A^1$ is a hydrogen atom is used in combination with a nitrogen-centered coordination compound or an oxygen-centered coordination compound, the coordination compound is used in an amount of preferably from 0.1 mol to 10 mol with respect to 1 mol of the compound represented by Formula (21).

<Product>

The iodine-containing compound obtained may be a polymer. The polymer may be a block copolymer, a random copolymer, or an alternating copolymer.

When the iodine-containing compound obtained is a polymer, the molecular weight of the polymer can be controlled by the reaction time, the type and amount of the compound represented by Formula (21) and the compound represented by (22), and the amount of the Compound (10).

For example, the number average molecular weight (Mn) of the polymer may be from 100 to 1,000,000, from 1,000 to 500,000, or from 10,000 to 200,000.

The weight average molecular weight (Mw) of the polymer may be from 100 to 1,000,000, from 1,000 to 500,000, or from 10,000 to 200,000.

The number average molecular weight (Mn) and the weight average molecular weight (Mw) in the present disclosure are obtained by Size Exclusion Chromatography (SEC) measurement, in which polystyrene is used as a standard material for molecular weight conversion. The apparatus and the conditions, except for the mobile phase, are in accordance with the Examples in Japanese Patent Application Laid-Open (JP-A) No. 2001-226846. Tetrahydrofuran is used for the mobile phase, and the measurement is performed at 30° C. For polymers insoluble in tetrahydrofuran at 30° C., solvents in which the polymers are soluble are selected from isophorone, 2-chlorobenzotrifluoride, 2,6-dichlorobenzotrifluoride, 3',5'-bis(trifluoromethyl)acetophenone and a mixture thereof, and a measurement is carried out at from 140° C. to 200° C.

By the production method according to the present disclosure, the polydispersity of the polymer to be obtained can be controlled to, for example, 2.5 or less. By the production method according to the present disclosure, it is also possible to obtain a polymer having a very narrow molecular weight distribution, for example, with a polydispersity of preferably 2.1 or less, 2.0 or less, 1.9 or less, 1.8 or less, 1.7 or less, 1.6 or less, or 1.5 or less. The lower limit of the polydispersity is 1.0 by definition.

The polydispersity (PD), which is an indicator of molecular weight distribution, is calculated by the following formula.

{PD=Mw (weight average molecular weight)/Mn (number average molecular weight)}

In the measurement of the polydispersity, the same solvent is used for the Mn and Mw measurements by the SEC.

In the production method according to the present disclosure, when a polymer is produced using an azo radical initiator or a peroxide radical initiator in combination, the obtained iodine-containing compound partly includes a polymer having a structure originating from the radical initiator used. However, in the production method according to the present disclosure, the ratio of the structure originating from the azo radical initiator or peroxide radical initiator used with respect to polymer ends of the obtained polymer can be reduced as compared to polymerization methods using a general azo radical initiator or peroxide radical initiator. In other words, by the production method according to the present disclosure, since it is possible to allow the polymerization to proceed starting from the Compound (10) instead of polymerizing monomers starting from the azo radical initiator or peroxide radical initiator, the ratio of the structures originating from the used azo radical initiator or peroxide radical initiator incorporated into the polymer can be reduced. The ratio of the structures originating from the azo radical initiator or peroxide radical initiator with respect to the mol number of the polymer ends is preferably 40 mol % or less, more preferably 30 mol % or less, further preferably 20 mol % or less, and particularly preferably 10 mol % or less.

Whether or not the ratio of the structures originating from the azo radical initiator or peroxide radical initiator with respect to the mol number of the polymer ends is 40 mol % or less, 30 mol % or less, 20 mol % or less, or 10 mol % or less is determined by calculating the mol number of the initiator using NMR and calculating the ratio of the mol number of the initiator with respect to the mol number of the polymer ends defined by Formula X. In Formula X, the average molecular weight of the repeating units is the arithmetic mean of the molecular weights of the repeating units weighted by the mole fraction.

(mol number of polymer ends)=2×Mn/(average molecular weight of repeating units in polymer) (Formula X)

When a radical formed by decomposition of a radical initiator has a multiple bond between a carbon atom and a heteroatom, the foregoing matter can also be determined by IR.

[Production Method of Iodine-Containing Compound]

As described above, the production method according to the present disclosure includes reacting the Compound (10) with the compound represented by Formula (3) in the presence of at least one selected from the group consisting of the compound represented by Formula (21) and the compound represented by Formula (22).

In one embodiment, the production method according to the present disclosure can produce a polymer of a fluorine-containing monomer or a polymer of a chlorine-containing monomer. In one embodiment, the production method according to the present disclosure can produce a copolymer of a fluorine-containing monomer or a chlorine-containing monomer and another monomer. In one embodiment, the production method according to the present disclosure can introduce a cross-linked structure into a fluorine-containing polymer or a chlorine-containing polymer.

Hereinafter, exemplary embodiments of the production method according to the present disclosure (first to third embodiments) will be described.

(1) First Embodiment

The method for producing an iodine-containing compound according to the first embodiment includes reacting Compound (10) having a substructure represented by Formula (1) with a compound represented by Formula (5) in the presence of at least one selected from the group consisting of a compound represented by Formula (21) and a compound represented by Formula (22). The method for producing an iodine-containing compound according to the first embodiment is hereinafter also referred to as the "production method according to the first embodiment".

In the production method according to the first embodiment, owing to the presence of the at least one selected from the group consisting of the compound represented by Formula (21) and the compound represented by Formula (22), the terminal iodine in the Compound (10) is abstracted, and a polymerization reaction of the compound represented by Formula (5) is initiated by a radical generated at the terminal end thereof. By employing this method, a fluorine-containing polymer or a chlorine-containing polymer having a highly controlled molecular weight distribution can be obtained.

Specific examples of the reaction conditions are described below.

In a container substituted with an inert gas or vacuum-reduced, at least one compound selected from the group consisting of the compound represented by Formula (21) and the compound represented by Formula (22), the Compound (10), and the compound represented by Formula (5) are mixed. Plural kinds of compounds represented by Formula (5) may be mixed. As needed, a radical initiator other than the Compound (10), such as an azo radical initiator, a peroxide radical initiator or the like, is mixed. A reaction control agent other than the compound represented by Formula (21) and the compound represented by Formula (22) may also be used in combination.

Examples of the inert gas include nitrogen, argon, and helium. Among them, nitrogen or argon is preferable, and nitrogen is more preferable.

In the production method according to the first embodiment, the Compound (10) is used in an amount of preferably from 0.001 mol to 1 mol, more preferably from 0.01 mol to 1 mol, and further preferably from 0.02 mol to 0.5 mol, with respect to 1 mol of the compound represented by Formula (5).

The reaction can be carried out without any solvent, and may also be carried out using an organic solvent (including an ionic liquid) or an aqueous solvent normally used in general radical polymerization.

Next, the mixture obtained as described above is stirred. The reaction temperature and the reaction time can be adjusted according to the molecular weight, molecular weight distribution and the like of the product. From the viewpoint of favorably controlling the molecular weight distribution, the reaction temperature is preferably from 10° C. to 100° C., more preferably from 20° C. to 80° C., and may be from 30° C. to 60° C. The reaction time can be adjusted appropriately to obtain a desired molecular weight, and may be, for example, from 1 hour to 24 hours, or from 2 hours to 10 hours. Stirring is usually carried out at normal pressure, but may be carried out under pressurized or depressurized condition.

After the reaction is completed, the target compound is isolated by removing a solvent used and remaining monomers under reduced pressure using a conventional method, or by carrying out a re-precipitation treatment using a solvent in which the target compound is insoluble. Any reaction treatment method may be used as long as the method does not interfere with the target compound.

(2) Second Embodiment

The method for producing an iodine-containing compound according to the second embodiment is an embodiment in which, in the production method according to the present disclosure, the iodine-containing compound that is obtained is a copolymer obtained by copolymerizing a first compound represented by Formula (5) and a compound represented by Formula (3) that is different from the first compound. By the method for producing an iodine-containing compound according to the second embodiment, a copolymer including a fluorine-containing polymer or a chlorine-containing polymer represented by Formula (5) is favorably obtained. Hereinafter, the method for producing an iodine-containing compound according to the second embodiment is also referred to as a "production method according to the second embodiment". Hereinafter, the compound represented by Formula (3) that is different from the first compound, used for the copolymerization, is also referred to as a copolymerization monomer.

Details of the first compound are the same as the details of the compound represented by Formula (5) described above.

The copolymerization monomer may be a compound represented by Formula (5) that is different from the first compound, or a compound represented by Formula (3) that is different from the compound represented by Formula (5).

Examples of the copolymerization monomer include a (meth)acrylic ester monomer, a styrene monomer, a triallyl isocyanurate, ethylene, propylene, isobutylene, an alkyl vinyl ether, 1H,1H,2H-perfluoro(n-1-hexene), 1H,1H,2H-perfluoro(n-1-octene), 1,4-divinyl octafluorobutane, 1,6-divinyldodecafluorohexane, and a perfluoro(alkylvinyl ether), that are different from the first compound.

Examples of a preferable (meth)acrylic ester monomer include methyl (meth)acrylate, ethyl (meth)acrylate, propyl (meth)acrylate, and butyl (meth)acrylate, and methyl (meth)acrylate and butyl (meth)acrylate are more preferable.

Examples of a preferable styrene monomer include styrene, α-methylstyrene, 2-methylstyrene, 4-methyl styrene, 4-methoxystyrene, 4-chlorostyrene, 4-(chloromethyl)styrene, divinylbenzene, and 4-styrenesulfonic acid, or an alkali metal salt thereof, and styrene, 4-methoxystyrene, 4-chlorostyrene, and 4-(chloromethyl)styrene are more preferable. Examples of the alkali metal salt include a sodium salt and a potassium salt.

Examples of a preferable alkyl vinyl ether include methyl vinyl ether and ethyl vinyl ether.

Examples of a preferable perfluoro(alkyl vinyl ether) include perfluoro(methyl vinyl ether), perfluoro(ethyl vinyl ether), and perfluoro(n-propyl vinyl ether).

Among them, the copolymerization monomer is preferably at least one selected from the group consisting of ethylene, propylene, isobutylene, an alkyl vinyl ether, hexafluoropropylene, a perfluoro(alkyl vinyl ether), triallyl isocyanurate, 1,4-divinyl octafluorobutane, 1,6-divinyl dodecafluorohexane, vinyl acetate, styrene, butyl acrylate, and divinylbenzene.

Copolymerization can be block copolymerization, random copolymerization, or alternating copolymerization. A block copolymer, a random copolymer, and an alternating copolymer can be produced, for example, by the following methods.

—Block Copolymer—

By using the Compound (10) and at least one selected from the group consisting of the compound represented by Formula (21) and the compound represented by Formula (22), for example, an A-B diblock copolymer, such as trifluoroethylene-styrene, a B-A-B triblock copolymer, such as styrene-trifluoroethylene-styrene or the like can be obtained.

A block copolymer may be obtained, for example, by a production method including reacting Compound (10) that is a polymer of the first compound represented by Formula (5) and having the substructure represented by Formula (1) with a compound represented by Formula (3) that is different from the first compound in the presence of at least one selected from the group consisting of the compound represented by Formula (21) and the compound represented by Formula (22). The block copolymerization may be carried out in combination with a radical initiator other than the Compound (10).

For example, a case of obtaining an A-B diblock copolymer, for example, a case of producing a trifluoroethylene-styrene copolymer, will be described below. First, polytrifluoroethylene is produced by the method as described in the production method according to the first embodiment. Next, the polytrifluoroethylene thus obtained is mixed with styrene, and a reaction is carried out as described in the production method according to the first embodiment, to obtain a trifluoroethylene-styrene copolymer. Here, in the polymerization of the copolymerization monomer, the term "compound represented by Formula (5)", which is polymerized in the first embodiment, is replaced with the term "copolymerization monomer".

In the case of producing a B-A-B triblock copolymer, a diiodo halogen-containing organic compound may be used instead of the monoiodo halogen-containing organic compound in the foregoing method for producing an A-B diblock copolymer.

The method for producing a block copolymer described above may be a method in which, after producing one block, a reaction for producing the next block is directly initiated, or a method in which the reaction for producing the next block is initiated after termination of the reaction followed by purification. Isolation of the block copolymer can be performed by general methods.

—Random Copolymer, Alternating Copolymer—

A random copolymer or an alternating copolymer can be obtained by reacting the first compound represented by Formula (5) and a copolymerization monomer together in the presence of at least one selected from the group consisting of the compound represented by Formula (21) and the compound represented by Formula (22). The copolymerization may be performed in combination with a radical initiator other than the Compound (10).

Whether the obtained copolymer is a random copolymer or an alternating copolymer is determined by the types of the first compound and the copolymerization monomer, as well as the relative amounts thereof.

In both cases of random copolymerization and alternating copolymerization, the same conditions as those described in the description of the first embodiment can be employed for the rest of the polymerization conditions.

(3) Third Embodiment

The method for producing an iodine-containing compound according to the third embodiment is an embodiment in which, in Formula (3), each of $R^1$ to $R^4$ independently represents a hydrogen atom, a chlorine atom, a bromine atom, an iodine atom, or a substituted or unsubstituted organic group having from 1 to 40 carbon atoms and having at least one reactive carbon-carbon double bond, and $R^1$ and $R^4$ or $R^2$ and $R^3$ may be linked to form a ring structure, and Formula (3) contains at least two reactive carbon-carbon double bonds. In other words, the method for producing an iodine-containing compound according to the third embodiment is an embodiment in which a compound represented by Formula (3) containing at least two reactive carbon-carbon double bonds is used as the compound represented by Formula (3). Hereinafter, the method for producing an iodine-containing compound according to the third embodiment is also referred to as the "production method according to the third embodiment".

By using the compound represented by Formula (3) containing at least two reactive carbon-carbon double bonds, a cross-linked structure can be introduced into Compound (10) that contains fluorine. For example, by using, as the Compound (10), a fluorine-containing polymer or a chlorine-containing polymer, the end of which is protected with iodine, and reacting the compound represented by Formula (3) containing at least two reactive carbon-carbon double bonds in the presence of at least one selected from the group consisting of the compound represented by Formula (21) and the compound represented by Formula (22), a cross-linked structure can be introduced.

Specific reaction conditions are the same as the reaction conditions described in the first embodiment. Here, the term "the compound represented by Formula (5)", which is polymerized in the first embodiment, is replaced with the term "compound represented by Formula (3) containing at least two reactive carbon-carbon double bonds". In the third embodiment, the Compound (10) is used in an amount of preferably from 0.01 mol to 10 mol, more preferably from 0.05 mol to 5 mol, and further preferably from 0.1 mol to 1.2 mol, with respect to 1 mol of the compound represented by Formula (3) containing at least two reactive carbon-carbon double bonds.

EXAMPLES

Embodiments according to the present disclosure are specifically described with reference to the Examples below; however, the embodiments according to the present disclosure are not limited by the following Examples. Examples 1 to 12 below correspond to working examples, and Examples 13 to 15 correspond to comparative examples.

Example 1

In a stainless steel autoclave equipped with a stirrer and having an internal volume of 30 mL, placed in a nitrogen-purged glove box, 0.024 g (0.10 mmol) of an azo radical initiator "V-40" (trade name, FUJIFILM Wako Pure Chemical Corporation), 0.012 g (0.10 mmol) of 9-borabicyclo[3.3.1]nonane, 0.016 g (0.20 mmol) of pyridine, 0.035 g (0.1 mmol) of n-nonafluorobutyl iodide, and 17.9 g of benzotrifluoride were introduced.

After 3.2 g (50 mmol) of vinylidene fluoride was injected under pressure, stirring was started while the internal temperature was raised to 100° C. By 5 hours of stirring at 200 rpm (200 revolutions per minute) while maintaining the internal temperature, the internal pressure was decreased from 1.4 MPa (gauge pressure) to 1.3 MPa.

After cooling the autoclave in an ice water bath, the autoclave was purged of unreacted vinylidene fluoride.

The resulting polymer solution was vacuum dried to obtain a solid. The solid was added to 20 mL of methanol and stirred for 30 minutes, and then the solid and the supernatant were separated using a centrifuge. The obtained solid was vacuum dried to obtain 0.19 g of solid.

Size exclusion chromatography measurement of the obtained solid using tetrahydrofuran as a mobile phase confirmed that the obtained solid had a Mn of 4,900 and a Mw of 9,700.

The calculated polydispersity (Mw/Mn) of the fluorine-containing polymer was 2.0.

1H-NMR and 19F-NMR measurements of the obtained solid confirmed that the calculated ratio of the mol number of the structures originating from V-40 contained in the polymer with respect to the mol number of the polymer ends was 5 mol % or less.

Example 2

In a stainless steel autoclave equipped with a stirrer and having an internal volume of 30 mL, placed in a nitrogen-purged glove box, 0.024 g (0.10 mmol) of an azo radical initiator "V-40" (trade name, FUJIFILM Wako Pure Chemical Corporation), 0.012 g (0.10 mmol) of 9-borabicyclo[3.3.1]nonane, 0.016 g (0.20 mmol) of pyridine, 0.035 g (0.10 mmol) of n-nonafluorobutyl iodide, and 17.9 g of benzotrifluoride were introduced and freeze degassed.

After 3.2 g (50 mmol) of vinylidene fluoride was injected under pressure, stirring was started while the internal temperature was raised to 100° C. By 10 hours of stirring at 200 rpm while maintaining the internal temperature, the internal pressure was decreased from 1.4 MPa to 1.2 MPa.

After cooling the autoclave in an ice water bath, the autoclave was purged of unreacted vinylidene fluoride.

The resulting polymer solution was vacuum dried to obtain a solid. The solid was added to 20 mL of methanol and stirred for 30 minutes, and then the solid and the supernatant were separated using a centrifuge. The obtained solid was vacuum dried to obtain 0.32 g of solid.

Size exclusion chromatography measurement of the obtained solid using tetrahydrofuran as a mobile phase confirmed that the obtained solid had a Mn of 6,900 and a Mw of 11,600.

The calculated polydispersity (Mw/Mn) of the fluorine-containing polymer was 1.7.

1H-NMR and 19F-NMR measurements of the obtained solid confirmed that the calculated ratio of the mol number of the structures originating from V-40 contained in the polymer with respect to the mol number of the polymer ends was 5 mol % or less.

Example 3

In a stainless steel autoclave equipped with a stirrer and having an internal volume of 30 mL, placed in a nitrogen-purged glove box, 0.024 g (0.10 mmol) of an azo radical initiator "V-40" (trade name, FUJIFILM Wako Pure Chemical Corporation), 0.012 g (0.10 mmol) of 9-borabicyclo[3.3.1]nonane, 0.016 g (0.20 mmol) of pyridine, 0.035 g (0.10 mmol) of n-nonafluorobutyl iodide, and 17.9 g of benzotrifluoride were introduced and freeze degassed.

After 0.75 g (5.0 mmol) of hexafluoropropylene and 2.9 g (45 mmol) of vinylidene fluoride were injected under pressure, stirring was started while the internal temperature was raised to 100° C. By 10 hours of stirring at 200 rpm while maintaining the internal temperature, the internal pressure was decreased from 1.2 MPa to 1.1 MPa.

After cooling the autoclave in an ice water bath, the autoclave was purged of unreacted hexafluoropropylene and vinylidene fluoride.

The resulting polymer solution was vacuum dried to obtain a solid. The solid was added to 20 mL of methanol and stirred for 30 minutes, and then the solid and the supernatant were separated using a centrifuge. The obtained solid was vacuum dried to obtain 0.25 g of solid.

Size exclusion chromatography measurement of the obtained solid using tetrahydrofuran as a mobile phase confirmed that the obtained solid had a Mn of 5,400 and a Mw of 10,100.

The calculated polydispersity (Mw/Mn) of the fluorine-containing polymer was 1.9.

1H-NMR and 19F-NMR measurements of the obtained solid confirmed that the calculated ratio of the mol number of the structures originating from V-40 contained in the polymer with respect to the mol number of the polymer ends was 5 mol % or less.

Example 4

In a stainless steel autoclave equipped with a stirrer and having an internal volume of 30 mL, placed in a nitrogen-purged glove box, 0.012 g (0.050 mmol) of an azo radical initiator "V-40" (trade name, FUJIFILM Wako Pure Chemical Corporation), 0.010 g (0.050 mmol) of 1,4-bis(dimethylsilyl)benzene, 0.035 g (0.10 mmol) of n-nonafluorobutyl iodide, and 17.9 g of benzotrifluoride were introduced and freeze degassed.

After 3.2 g (50 mmol) of vinylidene fluoride was injected under pressure, stirring was started while the internal temperature was raised to 100° C. By 10 hours of stirring at 200 rpm while maintaining the internal temperature, the internal pressure was decreased from 1.4 MPa to 1.2 MPa.

After cooling the autoclave in an ice water bath, the autoclave was purged of unreacted vinylidene fluoride.

The resulting polymer solution was vacuum dried to obtain a solid. The solid was added to 20 mL of methanol and stirred for 30 minutes, and then the solid and the supernatant were separated using a centrifuge. The obtained solid was vacuum dried to obtain 0.29 g of solid.

Size exclusion chromatography measurement of the obtained solid using tetrahydrofuran as a mobile phase confirmed that the obtained solid had a Mn of 17,100 and a Mw of 32,400.

The calculated polydispersity (Mw/Mn) of the fluorine-containing polymer was 1.9.

1H-NMR and 19F-NMR measurements of the obtained solid confirmed that the calculated ratio of the mol number of the structures originating from V-40 contained in the polymer with respect to the mol number of the polymer ends was 5 mol % or less.

Example 5

In a stainless steel autoclave equipped with a stirrer and having an internal volume of 30 mL, placed in a nitrogen-purged glove box, 0.026 g (0.16 mmol) of 2,2'-azobis(isobutyronitrile), 0.040 g (0.16 mmol) of 9-iodine-9-borabicyclo[3.3.1]nonane, 0.025 g (0.32 mmol) of pyridine, 0.055 g (0.16 mmol) of n-nonafluorobutyl iodide, and 17.9 g of benzotrifluoride were introduced and freeze degassed.

After 9.3 g (80 mmol) of chlorotrifluoroethylene was injected under pressure, stirring was started while the internal temperature was raised to 75° C. By 6 hours of stirring at 200 rpm while maintaining the internal temperature, the internal pressure was decreased from 0.5 MPa to 0.3 MPa.

After cooling the autoclave in an ice water bath, the autoclave was purged of unreacted chlorotrifluoroethylene.

The resulting polymer solution was vacuum dried to obtain a solid. The solid was added to 50 mL of methanol and stirred for 30 minutes, and then the solid and the supernatant were separated using a centrifuge. The obtained solid was vacuum dried to obtain 3.9 g of solid.

Size exclusion chromatography of the obtained solid using 3',5'-bis(trifluoromethyl)acetophenone as a mobile phase confirmed that the obtained solid had a Mn of 24,700 and a Mw of 34,800.

The calculated polydispersity (Mw/Mn) of the fluorine-containing polymer was 1.4, and this radical polymerization exhibits characteristics of living radical polymerization.

Example 6

In a stainless steel autoclave equipped with a stirrer and having an internal volume of 30 mL, placed in a nitrogen-purged glove box, 0.033 g (0.20 mmol) of 2,2'-azobis(isobutyronitrile), 0.024 g (0.20 mmol) of 9-borabicyclo[3.3.1]nonane, 0.032 g (0.40 mmol) of pyridine, 0.069 g (0.20 mmol) of n-nonafluorobutyl iodide, and 11.5 g of acetonitrile were introduced and freeze degassed.

After 8.2 g (100 mmol) of trifluoroethylene was injected under pressure, stirring was started while the internal temperature was raised to 75° C. By 8 hours of stirring at 200 rpm while maintaining the internal temperature, the internal pressure was decreased from 1.4 MPa to 1.3 MPa.

After cooling the autoclave in an ice water bath, the autoclave was purged of unreacted trifluoroethylene.

The resulting polymer solution was vacuum dried to obtain a viscous liquid. The viscous liquid was added to 50 mL of methanol and stirred for 30 minutes, and then the viscous liquid at the bottom layer and the supernatant were separated using a centrifuge. The obtained viscous liquid was vacuum dried to obtain 0.57 g of solid.

Size exclusion chromatography measurement of the obtained solid using tetrahydrofuran as a mobile phase confirmed that the obtained solid had a Mn of 3,300 and a Mw of 6,700.

The calculated polydispersity (Mw/Mn) of the fluorine-containing polymer was 2.0.

1H-NMR and 19F-NMR measurements of the obtained solid confirmed that the calculated ratio of the mol number of the structures originating from 2,2'-azobis(isobutyronitrile) contained in the polymer with respect to the mol number of the polymer ends was 10 mol % or less.

Example 7

In a stainless steel autoclave equipped with a stirrer and having an internal volume of 30 mL, placed in a nitrogen-purged glove box, 0.033 g (0.20 mmol) of 2,2'-azobis(isobutyronitrile), 0.024 g (0.20 mmol) of 9-borabicyclo[3.3.1]nonane, 0.032 g (0.40 mmol) of pyridine, 0.069 g (0.20 mmol) of n-nonafluorobutyl iodide, and 11.5 g acetonitrile were introduced and freeze degassed.

After 6.3 g (100 mmol) of vinyl chloride was injected under pressure, stirring was started while the internal temperature was raised to 75° C. By 4 hours of stirring at 200 rpm while maintaining the internal temperature, the internal pressure was decreased from 0.3 MPa to 0.2 MPa.

After cooling the autoclave in an ice water bath, the autoclave was purged of unreacted vinyl chloride.

The resulting polymer solution was vacuum dried to obtain a solid. The solid was added to 20 mL of methanol and stirred for 30 minutes, and then the solid and the supernatant were separated using a centrifuge. The obtained solid was vacuum dried to obtain 0.63 g of solid.

Size exclusion chromatography measurement of the obtained solid using tetrahydrofuran as a mobile phase confirmed that the obtained solid had a Mn of 9,800 and a Mw of 18,600.

The calculated polydispersity (Mw/Mn) of the fluorine-containing polymer was 1.9.

1H-NMR and 19F-NMR measurements of the obtained solid confirmed that the calculated ratio of the mol number of the structures originating from 2,2'-azobis(isobutyronitrile) contained in the polymer with respect to the mol number of the polymer ends was 10 mol % or less.

Example 8

In a glass reactor having an internal volume of 20 mL placed in a nitrogen-purged glove box, 0.25 g of a fluorine-containing polymer obtained in the same manner as in Example 2, 0.0082 g (0.050 mmol) of 2,2'-azobis(isobutyronitrile), 0.024 g (0.20 mmol) of 9-borabicyclo[3.3.1]nonane, 0.032 g (0.40 mmol) of pyridine, 1.0 g (10 mmol) of styrene, 1.5 g of acetonitrile, and a magnetic stirrer were introduced.

Stirring was started while the temperature of the oil bath was raised to 80° C. Stirring was carried out at 200 rpm for 2 hours while the temperature was maintained.

The reactor was allowed to cool at room temperature.

The resulting polymer solution was vacuum dried to obtain a solid. 30 mL of toluene and 5 L of methanol were added to this solid and stirred for 30 minutes, and then the solid and the supernatant were separated using a centrifuge. The obtained solid was vacuum dried to obtain 0.33 g of solid.

Size exclusion chromatography measurement of the obtained solid using tetrahydrofuran as a mobile phase confirmed that the obtained solid had a Mn of 6,200 and a Mw of 13,900, and that the elution curve had a single peak.

The calculated polydispersity (Mw/Mn) of the fluorine-containing polymer was 2.2.

1H-NMR and 19F-NMR measurements of the obtained solid confirmed that the calculated molar ratio of vinylidene fluoride to styrene in the fluorine-containing copolymer was 86:14.

The results of the size exclusion chromatography and the NMR confirmed production of a block copolymer.

Example 9

In a glass reactor having an internal volume of 20 mL placed in a nitrogen-purged glove box, 0.016 g (0.10 mmol) of 2,2'-azobis(isobutyronitrile), 0.12 g (1.0 mmol) of 9-borabicyclo[3.3.1]nonane, 0.16 g (2.0 mmol) of pyridine, 0.35 (1.0 mmol) of n-nonafluorobutyl iodide, 1.3 g (10 mmol) of divinylbenzene (manufactured by Tokyo Chemical Industry Co., Ltd.), and 5.5 g of chlorobenzene were introduced.

Stirring was started while the temperature of the oil bath was raised to 80° C. Stirring was carried out at 200 rpm for 2 hours while the temperature was maintained. The reactor was then allowed to cool at room temperature.

The resulting polymer solution was centrifuged, and the solid and the supernatant were separated.

1H-NMR and 19F-NMR measurements of the obtained supernatant confirmed that the ratio of the mol number of fluorine atoms in the supernatant with respect to the mol number of the fluorine atoms in the n-nonafluorobutyl iodide supplied was 91 mol %.

Example 10

In a stainless steel autoclave equipped with a stirrer and having an internal volume of 30 mL, placed in a nitrogen-purged glove box, 0.026 g (0.16 mmol) of 2,2'-azobis(isobutyronitrile), 0.042 g (0.16 mmol) of triphenylsilane, 0.055 g (0.16 mmol) of n-nonafluorobutyl iodide, and 17.9 g of benzotrifluoride were introduced and freeze degassed.

After 9.3 g (80 mmol) of chlorotrifluoroethylene was injected under pressure, stirring was started while the internal temperature was raised to 75° C. By 6 hours of stirring at 200 rpm while maintaining the internal temperature, the internal pressure was decreased from 0.5 MPa to 0.2 MPa.

After cooling the autoclave in an ice water bath, the autoclave was purged of unreacted chlorotrifluoroethylene.

The resulting polymer solution was vacuum dried to obtain a solid. The solid was added to 50 mL of methanol and stirred for 30 minutes, and then the solid and the supernatant were separated using a centrifuge. The obtained solid was vacuum dried to obtain 5.7 g of solid.

Size exclusion chromatography measurement of the obtained solid using 3',5'-bis(trifluoromethyl)acetophenone as a mobile phase confirmed that the obtained solid had a Mn of 19,200 and a Mw of 37,300.

The calculated polydispersity (Mw/Mn) of the fluorine-containing polymer was 1.9.

1H-NMR and 19F-NMR measurements of the obtained solid confirmed that the calculated ratio of the mol number of the structures originating from 2,2'-azobis(isobutyronitrile) contained in the polymer with respect to the mol number of the polymer ends was 10 mol % or less.

Example 11

Stirring was carried out in the same manner as in Example 10 for 6 hours, except that 0.029 g (0.080 mmol) of 1,1,2,2-tetraphenyldisilane was used in place of 0.042 g (0.16 mmol) of triphenylsilane, whereby the internal pressure was decreased from 0.5 MPa to 0.3 MPa.

After cooling the autoclave in an ice water bath, the autoclave was purged of unreacted chlorotrifluoroethylene.

The resulting polymer solution was vacuum dried to obtain a solid. The solid was added to 50 mL of methanol and stirred for 30 minutes, and then the solid and the supernatant were separated using a centrifuge. The obtained solid was vacuum dried to obtain 5.1 g of solid.

Size exclusion chromatography measurement of the obtained solid using 3',5'-bis(trifluoromethyl)acetophenone as a mobile phase confirmed that the obtained solid had a Mn=18,600 and a Mw=35,500.

The calculated polydispersity (Mw/Mn) of the fluorine-containing polymer was 1.9.

Example 12

In a stainless steel autoclave equipped with a stirrer and having an internal volume of 30 mL, placed in a nitrogen-purged glove box, 0.033 g (0.20 mmol) of 2,2'-azobis(isobutyronitrile), 0.392 g (1.0 mmol) of boron triiodide, 0.079 g (0.32 mmol) of pyridine, 0.069 g (0.20 mmol) of n-nonafluorobutyl iodide, and 11.5 g of acetonitrile were introduced and freeze degassed.

After 8.2 g (100 mmol) of trifluoroethylene was injected under pressure, stirring was started while the internal temperature was raised to 75° C. By 8 hours of stirring at 200 rpm while maintaining the internal temperature, the internal pressure was decreased from 1.4 MPa to 1.3 MPa.

After cooling the autoclave in an ice water bath, the autoclave was purged of unreacted trifluoroethylene.

The resulting polymer solution was vacuum dried to obtain a viscous liquid. The viscous liquid was added to 50 mL of methanol and stirred for 30 minutes, and then the viscous liquid at the bottom layer and the supernatant were separated using a centrifuge. The viscous liquid obtained was vacuum dried to obtain 0.74 g of solid.

Size exclusion chromatography measurement of the obtained solid using tetrahydrofuran as a mobile phase confirmed that the obtained solid had a Mn of 4,200 and a Mw of 6,000.

The calculated polydispersity (Mw/Mn) of the fluorine-containing polymer was 1.4, and this radical polymerization exhibits characteristics of living radical polymerization.

Example 13

Stirring was carried out for 10 hours in the same manner as in Example 2 except that 9-borabicyclo[3.3.1]nonane was not used, whereby the internal pressure was increased from 1.4 MPa to 1.5 MPa.

After cooling the autoclave in an ice water bath, the autoclave was purged of unreacted vinylidene fluoride.

The obtained reaction solution was vacuum dried to obtain a viscous liquid. This liquid was added to 20 mL of methanol, stirred for 30 minutes, and then centrifuged, whereby no solid was obtained.

Example 14

Stirring was carried out in the same manner as in Example 5 for 6 hours, except that 9-iodo-9-borabicyclo[3.3.1]nonane was not used, whereby the internal pressure was decreased from 0.5 MPa to 0.2 MPa.

After cooling the autoclave in an ice water bath, the autoclave was purged of unreacted chlorotrifluoroethylene.

The resulting polymer solution was vacuum dried to obtain a solid. The solid was added to 50 mL of methanol and stirred for 30 minutes, and then the solid and the supernatant were separated using a centrifuge. The obtained solid was vacuum dried to obtain 6.1 g of solid.

Size exclusion chromatography measurement of the obtained solid using 3',5'-bis(trifluoromethyl)acetophenone as a mobile phase confirmed that the obtained solid had a Mn of 42, 200 and a Mw of 79, 900.

1H-NMR and 19F-NMR measurements of the obtained solid confirmed that the calculated ratio of the mol number of the structures originating from 2,2'-azobis(isobutyronitrile) contained in the polymer with respect to the mol number of the polymer ends was 10 mol % or less.

The calculated polydispersity (Mw/Mn) of the fluorine-containing polymer was 1.9. This indicates that the molecular weight distribution is wider than in Example 5.

Example 15

In a glass reactor having an internal volume of 20 mL placed in a nitrogen-purged glove box, 0.20 g of a fluorine-containing polymer obtained in the same manner as in Example 2, 0.0082 g (0.050 mmol) of 2,2'-azobis(isobutyronitrile), 1.0 g (10 mmol) of styrene, 1.5 g of acetonitrile, and a magnetic stirrer were introduced.

Stirring was started while the temperature of the oil bath was raised to 80° C. Stirring was carried out at 200 rpm for 2 hours while the temperature was maintained.

The reactor was allowed to cool at room temperature.

The resulting polymer solution was vacuum dried to obtain a solid. 30 mL of toluene and 5 mL of methanol were added to this solid, and stirred for 30 minutes, and then the solid and the supernatant were separated using a centrifuge. The obtained solid was vacuum dried to obtain 0.19 g of solid.

Size exclusion chromatography measurement of the obtained solid using tetrahydrofuran as a mobile phase confirmed that the obtained solid had a Mn of 5,100 and a Mw of 10,800, and that the elution curve had a single peak.

The calculated polydispersity (Mw/Mn) of the fluorine-containing polymer was 2.1.

1H-NMR measurement of the obtained solid confirmed that the calculated molar ratio of vinylidene fluoride to styrene in the fluorine-containing copolymer was 97:3. This indicates that the fluorine-containing polymer obtained by the method of Example 2 was hardly consumed, and that the synthesis of the block copolymer was more difficult than in Example 8.

The disclosure of Japanese Patent Application No. 2020-151426 is incorporated herein by reference in its entirety.

All references, patent applications, and technical standards described herein are hereby incorporated by reference to the same extent that individual references, patent applications, and technical standards are specifically and individually incorporated by reference.

The invention claimed is:

1. A method for producing an iodine-containing compound, the method comprising reacting Compound (10) having a substructure represented by the following Formula (1) and a compound represented by the following Formula (3) in the presence of at least one selected from the group consisting of a compound represented by the following Formula (21) and a compound represented by the following Formula (22):

$$* - \underset{X^1}{\overset{X}{\underset{|}{C}}} - I \quad (1)$$

$$R^{21} - \underset{\underset{R^{22}}{B}}{\overset{A^1}{\underset{|}{}}} \quad (21)$$

$$R^{23} - \underset{\underset{A^2}{Si}}{\overset{R^{24}}{\underset{|}{}}} - R^{25} \quad (22)$$

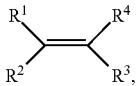
(3)

wherein, in Formula (1), * represents a binding site bonded to an organic group; X represents a fluorine atom or a chlorine atom; $X^1$ represents a hydrogen atom, a fluorine atom, a chlorine atom, a bromine atom, an iodine atom, or —$CX^5X^6X^7$; and each of $X^5$ to X' independently represents a hydrogen atom, a fluorine atom, or a chlorine atom;

wherein, in Formula (21), $R^{21}$ represents a hydrogen atom, an iodine atom, or a substituted or unsubstituted organic group having from 1 to 20 carbon atoms; $R^{22}$ represents a hydrogen atom, an iodine atom, a substituted or unsubstituted organic group having from 1 to 20 carbon atoms, or a boron-containing group, wherein a boron atom in the boron-containing group is bonded to the boron atom in Formula (21); $R^{21}$ and $R^{22}$ may be linked to form a ring structure; $A^1$ represents a hydrogen atom, a chlorine atom, a bromine atom, or an iodine atom; and the boron atom in Formula (21) may be further coordinated with a ligand;

wherein, in Formula (22), each of $R^{23}$ and $R^{24}$ independently represents a hydrogen atom, an iodine atom, or a substituted or unsubstituted organic group having from 1 to 20 carbon atoms, and $R^{25}$ represents a hydrogen atom, an iodine atom, a substituted or unsubstituted organic group having from 1 to 20 carbon atoms, or a silicon-containing group, wherein a silicon atom in the silicon-containing group is bonded to the silicon atom in Formula (22), with the proviso that not all of $R^{23}$ to $R^{25}$ are hydrogen atoms; two or more of $R^{23}$, $R^{24}$, and $R^{25}$ may be linked to form a ring structure; and $A^2$ represents a hydrogen atom, a chlorine atom, a bromine atom, or an iodine atom; and wherein, in Formula (3), each of $R^1$ to $R^4$ independently represents a hydrogen atom, a fluorine atom, a chlorine atom, a bromine atom, an iodine atom, or a substituted or unsubstituted organic group having from 1 to 40 carbon atoms; and $R^1$ and $R^4$, or $R^2$ and $R^3$ may be linked to form a ring structure.

2. The method according to claim 1,
wherein, in Formula (3), each of $R^1$ to $R^4$ independently represents a hydrogen atom, a chlorine atom, a bromine atom, an iodine atom, or a substituted or unsubstituted organic group having from 1 to 40 carbon atoms and having at least one reactive carbon-carbon double bond, and $R^1$ and $R^4$, or $R^2$ and $R^3$ may be linked to form a ring structure, and
wherein Formula (3) has at least two reactive carbon-carbon double bonds.

3. The method according to claim 1, wherein the compound represented by Formula (3) comprises a compound represented by the following Formula (5):

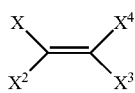
(5)

wherein, in the formula, X represents a fluorine atom or a chlorine atom; each of $X^2$ to $X^4$ independently represents a hydrogen atom, a fluorine atom, a chlorine atom, a bromine atom, an iodine atom, or —$CX^5X^6X^7$; and each of $X^5$ to X' independently represents a hydrogen atom, a fluorine atom, or a chlorine atom.

4. The method according to claim 3, wherein the iodine-containing compound obtained is a copolymer formed by copolymerization of a first compound represented by Formula (5) and a compound represented by Formula (3) that is different from the first compound.

5. The method according to claim 4, wherein the copolymerization is block copolymerization.

6. The method according to claim 4, wherein the copolymerization is random copolymerization or alternating copolymerization.

7. The method according to claim 4, wherein the compound represented by Formula (3) that is different from the first compound is at least one selected from the group consisting of ethylene, propylene, isobutylene, alkyl vinyl ether, hexafluoropropylene, perfluoro(alkyl vinyl ether), triallyl isocyanurate, 1,4-divinyl octafluorobutane, 1,6-divinyl dodecafluorohexane, vinyl acetate, styrene, butyl acrylate, and divinylbenzene.

8. The method according to claim 3, wherein the compound represented by Formula (5) is at least one selected from the group consisting of vinyl fluoride, vinylidene fluoride, trifluoroethylene, chlorotrifluoroethylene, bromotrifluoroethylene, iodotrifluoroethylene, tetrafluoroethylene, hexafluoropropylene, 1,3,3,3-tetrafluoropropylene, 2,3,3,3-tetrafluoropropylene, 1-chloro-1-fluoroethylene, 1-bromo-1-fluoroethylene, 1-iodo-1-fluoroethylene, 1,1-dibromo-2,2-difluoroethylene, 1,1-difluoro-2,2-diiodoethylene, 1,2-dichloro-1,2-difluoroethylene, 1,2-dibromo-1,2-difluoroethylene, 1,2-difluoro-1,2-diiodoethylene, vinyl chloride, and vinylidene chloride.

9. The method according to claim 1, wherein the Compound (10) is a compound represented by the following Formula (11) or a compound represented by the following Formula (12):

(11)

(12)

wherein, in the formulas, $R^{11}$ represents a perfluoroalkyl group having from 1 to 4 carbon atoms; $R^{12}$ represents a perfluoroalkylene group having from 1 to 4 carbon atoms; each X independently represents a fluorine atom or a chlorine atom; each of $X^{21}$ to $X^{23}$ independently represents a hydrogen atom, a fluorine atom, a chlorine atom, a bromine atom, or —$CX^{24}X^{25}X^{26}$; and each of $X^{24}$ to $X^{26}$ independently represents a hydrogen atom, a fluorine atom, or a chlorine atom.

10. The method according to claim 1, wherein the Compound (10) is a compound containing a plurality of units represented by the following Formula (4):

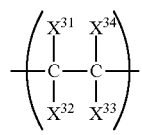

(4)

wherein, in the formula, each of $X^{31}$ to $X^{34}$ independently represents a hydrogen atom, a fluorine atom, a chlorine atom, a bromine atom, an iodine atom, or —$CX^{35}X^{36}X^{37}$; and each of $X^{35}$ to $X^{37}$ independently represents a hydrogen atom, a fluorine atom, or a chlorine atom.

11. The method according to claim 10, wherein a fluorine content of the Compound (10) is 50% by mass or more.

12. The method according to claim 1,
wherein the iodine-containing compound obtained is a polymer, and
wherein polydispersity of the polymer is 2.0 or less.

13. The method according to claim 1, wherein, in Formula (21), $A^1$ is a hydrogen atom and the boron atom has a ligand, or $A^1$ is an iodine atom.

14. The method according to claim 1, wherein, in Formula (22), at least one selected from the group consisting of $R^{23}$, $R^{24}$, and $R^{25}$ contains an aromatic ring.

* * * * *